(12) United States Patent
Harviainen

(10) Patent No.: US 12,062,195 B2
(45) Date of Patent: *Aug. 13, 2024

(54) SYSTEM AND METHOD FOR OPTIMIZING DYNAMIC POINT CLOUDS BASED ON PRIORITIZED TRANSFORMATIONS

(71) Applicant: InterDigital Madison Patent Holdings, SAS, Paris (FR)

(72) Inventor: Tatu V J Harviainen, Helsinki (FI)

(73) Assignee: InterDigital Madison Patent Holdings, SAS, Paris (FR)

( * ) Notice: Subject to any disclaimer, the term of this patent is extended or adjusted under 35 U.S.C. 154(b) by 4 days.

This patent is subject to a terminal disclaimer.

(21) Appl. No.: 17/840,411

(22) Filed: Jun. 14, 2022

(65) Prior Publication Data
US 2022/0309689 A1 Sep. 29, 2022

Related U.S. Application Data

(63) Continuation of application No. 16/981,234, filed as application No. PCT/US2019/022994 on Mar. 19, 2019, now Pat. No. 11,373,319.
(Continued)

(51) Int. Cl.
*G06T 19/20* (2011.01)
*G06T 7/33* (2017.01)
*G06T 7/38* (2017.01)

(52) U.S. Cl.
CPC ............ *G06T 7/33* (2017.01); *G06T 7/38* (2017.01); *G06T 19/20* (2013.01); *G06T 2210/56* (2013.01)

(58) Field of Classification Search
None
See application file for complete search history.

(56) References Cited

U.S. PATENT DOCUMENTS 6,201,546 B1 3/2001 Border
8,471,849 B1 6/2013 Hickman
(Continued)

FOREIGN PATENT DOCUMENTS

CN 103745459 A 4/2014
CN 104502919 A 4/2015
(Continued)

OTHER PUBLICATIONS

Meng, Fang, and Hongbin Zha. "Streaming transmission of point-sampled geometry based on view-dependent level-of-detail." In Fourth International Conference on 3-D Digital Imaging and Modeling, 2003. 3DIM 2003. Proceedings., pp. 466-473. IEEE, 2003. IDS Jun. 15, 2022, NPL #19 (Year: 2003).*
(Continued)

*Primary Examiner* — Steven Z Elbinger
(74) *Attorney, Agent, or Firm* — Smadar Gefen

(57) ABSTRACT

An example disclosed method includes (i) transmitting a first point cloud to a client, wherein the first point cloud corresponds to a reference point cloud, (ii) receiving a second point cloud, and (iii) hierarchically determining changes in the second point cloud from the reference point cloud, wherein hierarchically determining the changes includes (a) identifying first areas in the second point cloud that have changed from the reference point cloud, and (b) for a first area having a highest priority, determining a first rigid 3D transformation that approximates a first change from the reference point cloud, and if the first rigid 3D transformation cannot be determined, further determining first points to be used to modify the reference point cloud, wherein the first points are representative of the first change.

28 Claims, 15 Drawing Sheets

Related U.S. Application Data

(60) Provisional application No. 62/645,603, filed on Mar. 20, 2018.

(56) References Cited

U.S. PATENT DOCUMENTS

| | | | |
|---|---|---|---|
| 8,525,848 | B2 | 9/2013 | Janson |
| 8,768,659 | B2 | 7/2014 | Vasudevan |
| 8,848,201 | B1 | 9/2014 | Bruce |
| 9,412,361 | B1 | 8/2016 | Geramifard et al. |
| 10,699,421 | B1 | 6/2020 | Cherevatsky |
| 11,328,474 | B2 | 5/2022 | Harviainen |
| 2004/0254787 | A1 | 12/2004 | Shah et al. |
| 2007/0047840 | A1* | 3/2007 | Xu .................. G06T 3/0075 382/294 |
| 2009/0128554 | A1 | 5/2009 | Elsberg |
| 2011/0115812 | A1 | 5/2011 | Minear |
| 2011/0273442 | A1 | 11/2011 | Drost et al. |
| 2012/0194517 | A1 | 8/2012 | Izadi |
| 2014/0198097 | A1 | 7/2014 | Evans |
| 2015/0006117 | A1 | 1/2015 | Zhang et al. |
| 2015/0035820 | A1 | 2/2015 | Le |
| 2015/0254499 | A1 | 9/2015 | Pang |
| 2016/0044240 | A1 | 2/2016 | Beers |
| 2016/0071318 | A1 | 3/2016 | Lee |
| 2016/0133044 | A1 | 5/2016 | Lynch |
| 2016/0333691 | A1 | 11/2016 | Puura |
| 2016/0371539 | A1 | 12/2016 | Ming |
| 2017/0083792 | A1 | 3/2017 | Rodriguez-Serrano et al. |
| 2017/0213394 | A1 | 7/2017 | Ratcliff |
| 2017/0214943 | A1 | 7/2017 | Cohen |
| 2017/0243352 | A1 | 8/2017 | Kutliroff |
| 2017/0264833 | A1* | 9/2017 | Barnes .............. G03B 15/0405 |
| 2017/0287216 | A1 | 10/2017 | Kim |
| 2017/0318477 | A1* | 11/2017 | Priest .................. G06T 7/97 |
| 2017/0323472 | A1* | 11/2017 | Barnes .............. G01C 19/5776 |
| 2017/0347122 | A1 | 11/2017 | Chou |
| 2018/0170388 | A1 | 6/2018 | Shin |
| 2019/0058859 | A1 | 2/2019 | Price |
| 2019/0087978 | A1 | 3/2019 | Tourapis |
| 2019/0096035 | A1 | 3/2019 | Li |
| 2019/0227145 | A1 | 7/2019 | Pishehvari |
| 2019/0289281 | A1 | 9/2019 | Badrinarayanan |
| 2019/0295266 | A1 | 9/2019 | Fan |
| 2020/0184602 | A1 | 6/2020 | Li |
| 2020/0311881 | A1 | 10/2020 | Lanman |
| 2021/0142522 | A1 | 5/2021 | Li et al. |
| 2023/0074296 | A1 | 3/2023 | Wang et al. |
| 2023/0080852 | A1 | 3/2023 | Meardi |

FOREIGN PATENT DOCUMENTS

| | | |
|---|---|---|
| CN | 105378792 A | 3/2016 |
| CN | 105630905 A | 6/2016 |
| CN | 106126816 A | 11/2016 |
| CN | 107040422 A | 8/2017 |
| CN | 107194983 | 9/2017 |
| CN | 107862293 | 3/2018 |
| DE | 102017011562 | 5/2018 |
| EP | 3167577 A1 | 5/2017 |
| EP | 3296962 | 3/2018 |
| GB | 2576548 A | 2/2020 |
| JP | 2015522987 A | 8/2015 |

OTHER PUBLICATIONS

Ramanathan, Subramanian, et. al., "Impact of Vertex Clustering on Registration-Based 3D Dynamic Mesh Coding". Image and Vision Computing, vol. 26, No. 7, Jul. 2, 2008, pp. 1012-1026.

Collet, Alvaro, et. al. "High-Quality Streamable Free-Viewpoint Video". ACM Transactions on Graphics (TOG), vol. 34, No. 4, (2015), 13 pages.

Thanou, Dorina, et. al. "Graph-Based Motion Estimation And Compensation For Dynamic 3D Point Cloud Compression". IEEE International Conference on Image Processing (ICIP), (2015), 5 pages.

Bouaziz, Sofien, et. al., "Sparse Iterative Closest Point". Eurographics Symposium on Geometry Processing, vol. 32, No. 5, (2013), 11 pages.

De Queiroz, Ricardo L., et. al. "Compression Of 3D Point Clouds Using A Region-Adaptive Hierarchical Transform". IEEE Transactions on Image Processing, Aug. 2016, vol. 25, No. 8, pp. 3947-3956.

Huang, Jing, et. al., "Point Cloud Matching Based On 3D Self-Similarity". IEEE Computer Society Conference on Computer Vision and Pattern Recognition Workshops (CVPRW), (2012), pp. 1-8.

Sultani, Zainab Namh, et. al., "Kinect 3D Point Cloud Live Video Streaming". International Conference on Communication, Management and Information Technology (ICCMIT), Procedia Computer Science, vol. 65, (2015), pp. 125-132.

Wang, Zunran, et. al., "Preprocessing And Transmission For 3D Point Cloud Data". International Conference on Intelligent Robotics and Applications, (2017), pp. 438-449.

Huang, Jing, et. al., "Point Cloud Labeling Using 3D Convolutional Neural Network". IEEE 23rd International Conference on Pattern Recognition (ICPR), (2016), pp. 2670-2675.

Saransaari, Hannu, "Visualization Of Large Point Clouds". Umbra 3D Blog Article dated Apr. 7, 2016, available at: https://web.archive.org/web/20170928180350/http://umbra3d.com/visualization-of-large-point-clouds, 4 pages.

Qi, Charles R., et. al., "PointNet: Deep Learning on Point Sets For 3D Classification and Segmentation". Supplementary Material, arXiv:1612.00593v2, Apr. 10, 2017, 19 pages.

Liang, Shu, et. al., "3D Face Hallucination From A Single Depth Frame". IEEE 2nd International Conference On 3D Vision (3DV), Dec. 2014, 22 pages.

Gomes, Rafael Beserra, et. al., "Efficient 3D Object Recognition Using Foveated Point Clouds". Computers and Graphics, vol. 37, (2013), pp. 496-508.

"Point Cloud Library". Pointclouds.com, Web Archive dated Dec. 10, 2018, available at: https://web.archive.org/web/20181206231901/http://www.pointclouds.org/documentation/tutorials/cluster_extraction.php#/cluster-extraction, 6 pages.

Wikipedia, "Transformation Matrix". Wikipedia web article, available at: https://en.wikipedia.org/w/index.php?title=Transformation_matrix&oldid=788651536, version dated Jul. 2, 2017, 9 pages.

Orts-Escolano, Sergio, et. al., "Holoportation: Virtual 3D Teleportation In Real-Time". ACM Proceedings of the 29th Annual Symposium on User Interface Software and Technology, (2016), pp. 741-754.

Wang, Zongji, et. al., "VoxSegNet: Volumetric CNNs for Semantic Part Segmentation of 3D Shapes". Journal of Latex Class Files, vol. 14, No. 8, Aug. 2015, pp. 1-11.

International Search Report and Written Opinion of the International Searching Authority for PCT/US2019/021846 mailed Jun. 6, 2019, 11 pages.

Meng, Fang, et. al. "Streaming Transmission of Point-Sampled Geometry Based on View-Dependent Level-Of-Detail". Fourth International Conference on 3-D Digital Imaging and Modeling, Oct. 6-10, 2003, 8 pages.

Lequan, Yu, et. al., "PU-Net: Point Cloud Upsampling Network". Proceedings of the IEEE Conference on Computer Vision and Pattern Recognition, (2018), pp. 2790-2799.

Seo, Jinseok, et. al., "Levels of Detail (LOD) Engineering of VR Objects". Proceedings of The ACM Symposium on Virtual Reality Software and Technology, Dec. 20-22, 1999, pp. 104-110.

International Search Report and Written Opinion of the International Searching Authority for PCT/US2019/022994 mailed Jun. 27, 2019, 13 pages.

Gupta, Sumit, et. al., "Compression of Dynamic 3D Geometry Data Using Iterative Closet Point Algorithm". Computer Vision and Image Understanding, vol. 87, No. 1-3, Jul. 1, 2002, pp. 116-130.

(56) References Cited

OTHER PUBLICATIONS

De Floriani, L., et. al., "Dynamic View-Dependent Multiresolution on A Client-Server Architecture". Computer Aided Design, vol. 32, No. 13, Nov. 1, 2000, pp. 805-823.
Hajizadeh, Mohammadali, et. al., "Eigenspace Compression: Dynamic 3D Mesh Compression by Restoring Fine Geometry to Deformed Coarse Models". Multimedia Tools and Applications, vol. 77, No. 15, Nov. 14, 2017, pp. 19347-19375.
Xu, Cao, et. al., "Point Cloud Colorization Based on Densely Annotated 3D Shape Dataset". Arix.org, Oct. 12, 2018.
Xiao, Yi, et. al., "Interactive Deep Colorization with Simultaneous Global and Local Inputs". Arix.org, Jan. 27, 2018.
Mammou, Khaled, et. al., "PCC Test Model Category 13 v3". International Organization for Standardization, MPEG Meeting; Motion Picture Expert Group or ISO/IEC JTC1/SC29/WG11, No. n17762, Jul. 2018, 18 pages.
International Search Report and Written Opinion of the International Searching Authority for PCT/US2019/065771 mailed Mar. 27, 2020, 12 pages.
International Preliminary Report on Patentability PCT/US2019/021846 issued on Sep. 22, 2020, 8 pages.
International Preliminary Report on Patentability PCT/US2019/022994 issued on Sep. 22, 2020, 10 pages.
Zhang, Richard, et al., "Real-Time User-Guided Image Colorization With Learned Deep Priors". ACM Transactions on Graphics, vol. 36, No. 4, Article 119, Jul. 2017, pp. 1-11.
Zhang, Richard, et. al., "Colorful Image Colorization". European Conference on Computer Vision, (2016), pp. 1-29.
Qi, Charles R., et. al., "PointNet: Deep Learning on Point Sets For 3D Classification and Segmentation". Presentation, Stanford University, (2017), 68 pages.
Lunscher, Nolan, et. al., "Point Cloud Completion Of Foot Shape From A Single Depth Map For Fit Matching Using Deep Learning View Synthesis". Proceedings of the IEEE International Conference on Computer Vision Workshops, (2017), pp. 2300-2305.
Han, Xiaoguang, et. al. "High-Resolution Shape Completion Using Deep Neural Networks For Global Structure And Local Geometry Inference". Proceedings of the IEEE International Conference On Computer Vision, (2017), pp. 85-93.
Mekuria, Rufael, et. al., "Overview Of The MPEG Activity On Point Cloud Compression". IEEE Data Compression Conference (DCC), (2016), pp. 620-620.
Liu, Zhenyu, et. al., "CU Partition Mode Decision For HEVC Hardwired Intra Encoder Using Convolution Neural Network". IEEE Transactions on Image Processing, vol. 25, No. 11, Nov. 2016, pp. 5088-5103.
Xu, Mai, et. al., "Reducing Complexity of HEVC: A Deep Learning Approach". IEEE Transactions on Image Processing, vol. 27, No. 10, (2018), pp. 1-17.
Zhu, Kongfeng, et. al., "No-Reference Video Quality Assessment Based On Artifact Measurement And Statistical Analysis". IEEE Transactions on Circuits and Systems for Video Technology, vol. 25, No. 4, (2015), pp. 533-546.
Yang, Ren, et. al., "Decoder-Side HEVC Quality Enhancement With Scalable Convolutional Neural Network". IEEE International Conference on Multimedia and Expo (ICME), Jul. 10-14, 2017, pp. 817-822.
Shi, Wenzhe, et. al., "Real-Time Single Image And Video Super-Resolution Using An Efficient Sub-Pixel Convolutional Neural Network". Proceedings of the IEEE Conference on Computer Vision and Pattern Recognition, (2016), pp. 1874-1883.
Chen, Tong, et. al., "DeepCoder: A Deep Neural Network Based Video Compression". IEEE Visual Communications and Image Processing (VCIP), (2017), 4 pages.
Yan, Ning, et. al., "A Convolutional Neural Network Approach For Half-Pel Interpolation In Video Coding". IEEE International Symposium on Circuits and Systems (ISCAS), (2017), 4 pages.
Pfaff, Jonathan, et. al., "Intra Prediction Modes based on Neural Networks". Joint Video Experts Team (JVET) of ITU-T SG 16 WP 3 and ISO/IEC JTC 1/SC 29/WG 11, JVET-J0037-v1, Apr. 10-20, 2018, pp. 1-14.
Merkle, Philipp, et. al., "CE3: Non-Linear Weighted Intra Prediction (Test 6.1.1)". Joint Video Experts Team (JVET) of ITU-T SG 16 WP 3 and ISO/IEC JTC 1/SC 29/WG 11, JVET-K0266-v1, Jul. 10-18, 2018, 4 pages.
Bailer, Werner, et. al., "Report of the AhG on Coded Representation of Neural Networks (NNR)". International Organization For Standardization, Coding Of Moving Pictures And Audio, ISO/IEC JTC1/SC29/WG11 MPEG 2018/ M42289, Apr. 2018, 3 pages.
Cheng, Zezhou, et. al., "Deep Colorization". Proceedings of the IEEE International Conference on Computer Vision, (2015), pp. 415-423.
Zhang, Rui, et. al., "Fusion Of Images And Point Clouds For The Semantic Segmentation Of Large-Scale 3D Scenes Based On Deep Learning". ISPRS Journal of Photogrammetry and Remote Sensing, vol. 143, (2018), pp. 85-96.
Kuma, Satoru, et. al., "PCC CE1.3 Recolor Method". Sony Corporation, International Organization For Standardization, Coding Of Moving Pictures And Audio, ISO/IEC JTC1/SC29/WG11 MPEG2017/ M42141, Jan. 2018, 9 pages.
Nakagami, Ohji, et. al., "Point cloud compression technology proposal by Sony". International Organization For Standardization, Coding Of Moving Pictures And Audio, ISO/IEC JTC1/SC29/WG11 MPEG2017/ M41665, Oct. 2017, 43 pages.
Qi, Charles R., et. al., "Pointnet++: Deep Hierarchical Feature Learning On Point Sets In A Metric Space". arXiv preprint arXiv:1706.02413, (2017), pp. 1-14.
Klokov, Roman, et. al., "Escape From Cells: Deep Kd-Networks For The Recognition Of 3d Point Cloud Models". Proceedings of the IEEE International Conference on Computer Vision, (2017), pp. 863-872.
Ben-Shabat, Yizhak, et. al., "3D Point Cloud Classification And Segmentation Using 3d Modified Fisher Vector Representation For Convolutional Neural Networks". arXiv preprint arXiv:1711.0824, Nov. 22, 2017, pp. 1-13.
Santana Núñez, José Miguel, et. al., "Visualization of Large Point Cloud in Unity". Eurographics Technical Report Series, (2019), pp. 23-24.
Nakagami, Ohji, et. al., "Point cloud compression technology proposal by Sony". International Organization For Standardization, Coding Of Moving Pictures And Audio, ISO/IEC JTC1/SC29/WG11 MPEG2017, M41665 Power Point Presentation, Oct. 2017, 43 pages.
Pfaff, Jonathan et. al., "Intra Prediction Modes based on Neural Networks". Joint Video Experts Team (JVET) of ITU-T SG 16 WP 3 and ISO/IEC JTC 1/SC 29/WG 11, JVET-J0037 Presentation, Apr. 13, 2018, 19 pages.

\* cited by examiner

SYSTEM AND METHOD FOR OPTIMIZING DYNAMIC POINT CLOUDS BASED ON PRIORITIZED TRANSFORMATIONS

CROSS-REFERENCE SECTION

The present application is a continuation application of U.S. patent application Ser. No. 16/981,234, entitled "SYSTEM AND METHOD FOR OPTIMIZING DYNAMIC POINT CLOUDS BASED ON PRIORITIZED TRANSFORMATIONS," filed Sep. 15, 2020, which claims benefit under 35 U.S.C. § 371 of International Application No. PCT/US2019/022994, entitled "SYSTEM AND METHOD FOR OPTIMIZING DYNAMIC POINT CLOUDS BASED ON PRIORITIZED TRANSFORMATIONS," filed on Mar. 19, 2019, which claims benefit under 35 U.S.C. § 119(e) from U.S. Provisional Patent Application No. 62/645,603 filed Mar. 20, 2018, entitled "System and Method for Optimizing Dynamic Point Clouds Based on Prioritized Transformations," each of which is incorporated herein by reference in its entirety.

BACKGROUND

As new systems and sensors become available for capturing high resolution three dimensional (3D) data, challenges emerge for transmitting the large data sizes of dynamic point cloud sequences. Tests of data throughput needed to distribute for example a full 3D appearance of a single person have revealed several network bottlenecks that restrict the practicality of high resolution data capture and distribution.

SUMMARY

According to some embodiments, a method, performed at a server, includes: transmitting a first point cloud to a client, wherein the first point cloud corresponds to a reference point cloud; receiving a second point cloud; and hierarchically determining changes in the second point cloud from the reference point cloud, wherein hierarchically determining the changes includes: identifying first areas in the second point cloud that have changed from the reference point cloud; prioritizing the first areas; and for a first area having a highest priority, determining whether a first rigid 3D transformation that approximates a first change from the reference point cloud exists; in response to a determination that the first rigid 3D transformation exists, determining the first rigid 3D transformation that approximates the first change from the reference point cloud; and in response to a determination that the first rigid 3D transformation does not exist, further determining first points to be used to modify the reference point cloud, wherein the first points are representative of the first change.

According to some embodiments, a method, performed at a server, includes: transmitting a first point cloud to a client, wherein the first point cloud corresponds to a reference point cloud; receiving a second point cloud; and hierarchically determining changes in the second point cloud from the reference point cloud, wherein hierarchically determining the changes includes: identifying first areas in the second point cloud that have changed from the reference point cloud; prioritizing the first areas; and for a first area having a highest priority, determining a first rigid 3D transformation that approximates a first change from the reference point cloud, and if the first rigid 3D transformation cannot be determined, further determining first points to be used to modify the reference point cloud, wherein the first points are representative of the first change.

In some embodiments, the first points to be used to modify the reference point cloud include at least one of (i) points to be removed from the reference point cloud or (ii) points added to the reference point cloud. In some embodiments, identifying the first areas includes comparing the second point cloud with the reference point cloud to identify areas in the second point cloud that deviate from the reference point cloud. Prioritizing the first areas includes, in some embodiments, assigning a respective first priority to each of the first areas based at least in part on a current viewpoint of the client. In some embodiments, assigning the respective first priority to each of the first areas includes determining the respective first priority using a size of the main area, an amount of deviation of the first area from the reference point cloud, and a distance of the first area from the current viewpoint of the client. Further, in some embodiments, determining whether the first rigid 3D transformation exists comprises determining whether a shape correspondence between the reference point cloud and the second point cloud has been found.

In some embodiments, the method further includes receiving, from the client, the current viewpoint. In some embodiments, the method further includes storing the reference point cloud, and updating the reference point cloud stored at the server by applying to the reference point cloud the first rigid 3D transformation if the first 3D rigid transformation has been determined. In some embodiments, the method further includes transmitting to the client an indication of the first area having the highest priority and the 3D transformation to update the reference point cloud at the client. The indication of the first main area having the highest priority includes, in some embodiments, bounding volume coordinates.

The method further includes, in some embodiments, storing the reference point cloud, and updating the reference point cloud stored at the server by modifying the reference point cloud with the first points if the first points have been determined. In some embodiments, the method further includes transmitting to the client an indication of the first points to update the reference point cloud at the client.

In some embodiments, hierarchically determining the changes further includes: identifying one or more first sub-areas within the first area having the highest priority, prioritizing the first sub-areas, and adding the prioritized first sub-areas to remaining prioritized first areas. In some embodiments, the method further includes, for an area with a next highest priority among the remaining prioritized first areas and the prioritized first sub-areas, determining (i) a second rigid 3D transformation that approximates a second change from the updated reference point cloud or (ii) second points to be used to modify the updated reference point cloud, wherein the second points are representative of the second change. In this regard, in some embodiments, the method further includes negotiating with the client a processing budget, where the processing budget provides at least an amount of time and a bandwidth available for a point cloud update, and where, determining the second rigid 3D transformation or the second points for the area with the next highest priority is carried out only when the processing budget is available.

Identifying the one or more first sub-areas includes, in some embodiments, comparing the second point cloud with the updated reference point cloud to identify finer grained areas that deviate from the updated reference point cloud. Prioritizing the first sub-areas areas includes, in some embodiments, assigning a respective second priority to each of the first sub-areas. In some embodiments, the method includes negotiating with the client a processing budget, wherein the processing budget provides at least an amount of time and a bandwidth available for a point cloud update.

At least one of the reference point cloud or the second point cloud includes, in some embodiments, sensor data. In some embodiments, the reference point cloud and the second point cloud are received from a storage medium as pre-captured dynamic sequences of point cloud data. Further, in some embodiments, the method further includes communicating with a plurality of clients, and carrying out the method for each of the plurality of clients.

According to some embodiments, a method, performed at a server, includes: transmitting an initial point cloud to a client; and hierarchically determining changes in a current point cloud from the initial point cloud, wherein hierarchically determining the changes includes: identifying main areas of change in the current point cloud; using a first main area of change to determine whether a first rigid 3D transformation that approximates a first change from the initial point cloud exists; in response to a determination that the first rigid 3D transformation exists, determining the first rigid 3D transformation that approximates the first change from the initial point cloud; in response to a determination that the first rigid 3D transformation does not exist, further determining first points to be used to modify the initial point cloud, wherein the first points are representative of the first change; identifying one or more finer-grained areas of residual change within the main area of change; using the one or more finer-grained areas of residual change and remaining main areas of change to determine whether a second rigid 3D transformation that approximates a second change from the initial point cloud exists; in response to a determination that the second rigid 3D transformation exists, determining the second rigid 3D transformation that approximates the second change from the initial point cloud; and in response to a determination that the second rigid 3D transformation does not exist, further determining second points to be used to further modify the initial point cloud, wherein the second points are representative of the second change.

According to some embodiments, a method, performed at a server, of transmitting time-varying point cloud data, includes: transmitting an initial point cloud to a client; and hierarchically determining changes in a current point cloud from the initial point cloud, wherein hierarchically determining the changes includes: identifying main areas of change in the current point cloud; using a first main area of change to determine a first rigid 3D transformation that approximates a first change from the initial point cloud, and if the first rigid 3D transformation cannot be determined, further determining first points to be used to modify the initial point cloud, wherein the first points are representative of the first change; identifying one or more finer-grained areas of residual change within the main area of change; and using the one or more finer-grained areas of residual change and remaining main areas of change to determine a second rigid 3D transformation that approximates a second change from the initial point cloud, and if the second rigid 3D transformation cannot be determined, further determining second points to be used to further modify the initial point cloud, wherein the second points are representative of the second change.

In some embodiments, the second rigid 3D transformation is determined for one of the one or more finer-grained areas of residual change. In some embodiments, the second rigid 3D transformation is determined for one of the remaining main areas of change. In some embodiments, the second rigid 3D transformation is determined for one of the remaining main areas of change. Further, in some embodiments, the method further includes transmitting to the client at least one of (i) the first rigid 3D transformation and first bounding volume coordinates indicative of a first changed area, (ii) the second rigid 3D transformation and second bounding volume coordinates indicative of a second changed area, (iii) the first points, and (iv) the second points.

According to some embodiments, a method, performed at a server, includes: receiving first 3D data as an initial point cloud; in response to a request from the client for a point cloud data streaming, transmitting the initial point cloud to the client and storing the initial point cloud as a reference point cloud; and for each current point cloud, iteratively performing a process including: receiving second 3D data as the current point cloud; receiving second 3D data as the current point cloud; performing a hierarchical inspection of the current point cloud relative to the reference point cloud including: identifying areas that deviate from the reference point cloud; separating the deviating areas into first clusters; prioritizing the first clusters by calculating a respective first score indicative of importance for each of the first clusters, each first score being calculated based at least in part on a current viewpoint of the client; and for a first cluster having a highest priority, determining whether a transformation approximating a first deviation from the reference point cloud exists; if the transformation exists, applying the transformation to the stored reference point cloud to update the reference point cloud, and transmitting an indication of an area in the first cluster and the transformation to the client; and if the transformation does not exist, performing at least one of adding and removing points from the stored reference point cloud to update the reference point cloud, and transmitting the points to the client.

In some embodiments, performing the hierarchical inspection of the current point cloud relative to the reference point cloud further includes: after processing the first cluster with the highest priority, identifying sub-areas within the first cluster that still deviate from the updated reference point cloud; separating the deviating sub-areas into second clusters; prioritizing the second clusters by calculating a respective second score indicative of importance for each of the second clusters, each second score being calculated based at least in part on the current viewpoint of the client; adding the prioritized second clusters to a rest of the prioritized first clusters, and for a next cluster having a next highest priority, determining whether another transformation approximating a second deviation from the updated reference point cloud exists; if the another transformation exists, applying the another transformation to the updated stored updated reference point cloud to further update the reference point cloud, and transmitting another indication of a sub-area in the processed first cluster and the another transformation to the client; and if the another transformation does not exist, performing at least one of adding or removing additional points from the updated reference point cloud to update the reference point cloud, and transmitting the additional points to the client.

In some embodiments, the process is terminated upon a request from the client or when a processing budget negotiated between the server and the client is no longer available for further processing.

Other embodiments include a system and a server configured (e.g., having a processor and a non-transitory computer-readable medium storing a plurality of instructions for execution by the processor) to perform the methods described herein. In some embodiments, the system also includes at least one 3D sensor.

BRIEF DESCRIPTION OF THE DRAWINGS

A more detailed understanding may be had from the following description, presented by way of example in conjunction with the accompanying drawings. Furthermore, like reference numerals in the figures indicate like elements.

The entities, connections, arrangements, and the like that are depicted in, and in connection with, the various figures are presented by way of example and not by way of limitation. As such, any and all statements or other indications as to what a particular figure depicts, what a particular element or entity in a particular figure is or has, and any and all similar statements, that may in isolation and out of context be read as absolute and therefore limiting, may only properly be read as being constructively preceded by a clause such as "In at least some embodiments, . . . " For brevity and clarity of presentation, this implied leading clause is not repeated ad nauseum in the detailed description of the drawings.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Example networks for implementations of example embodiments will now be described.

Figure 1A:
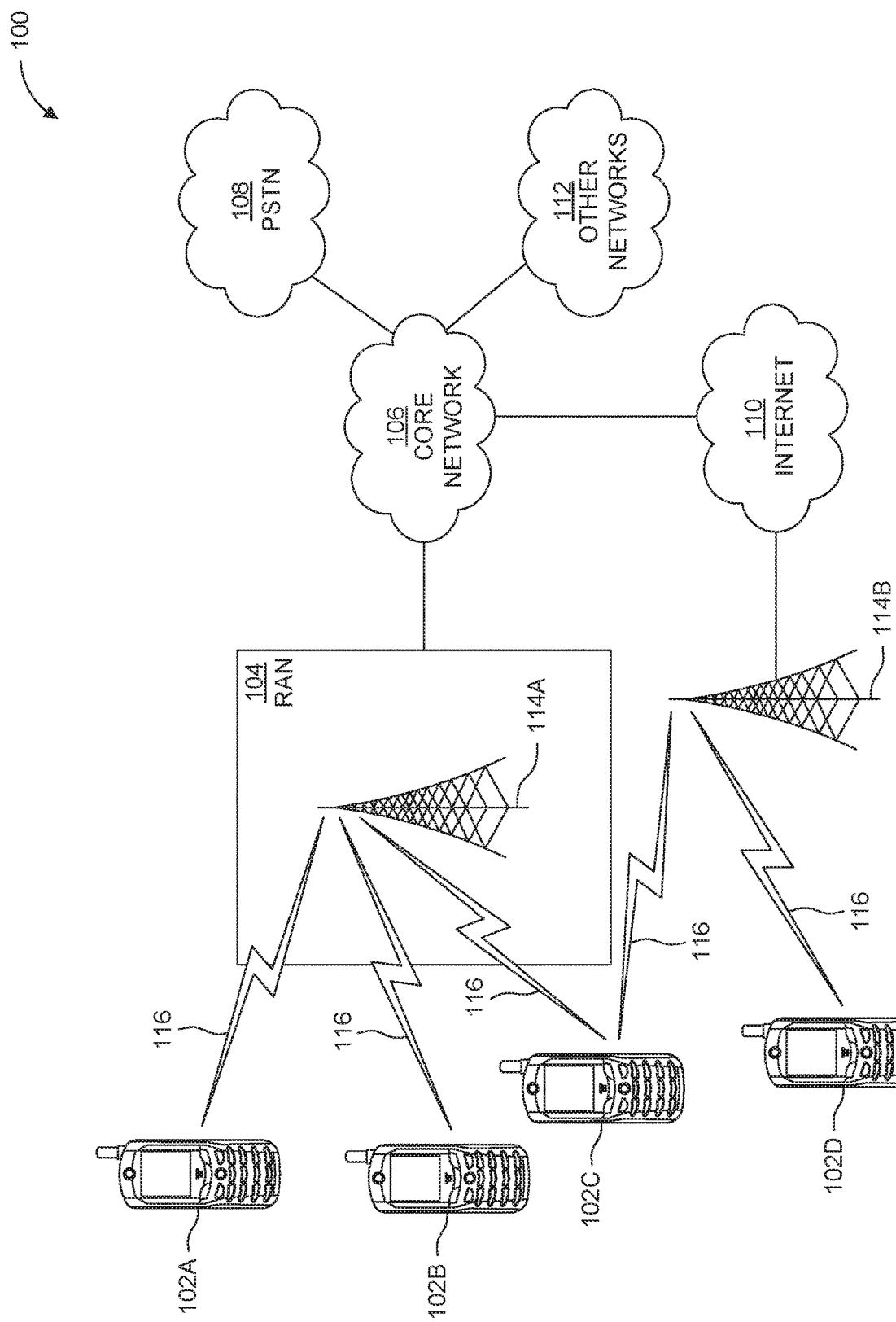
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
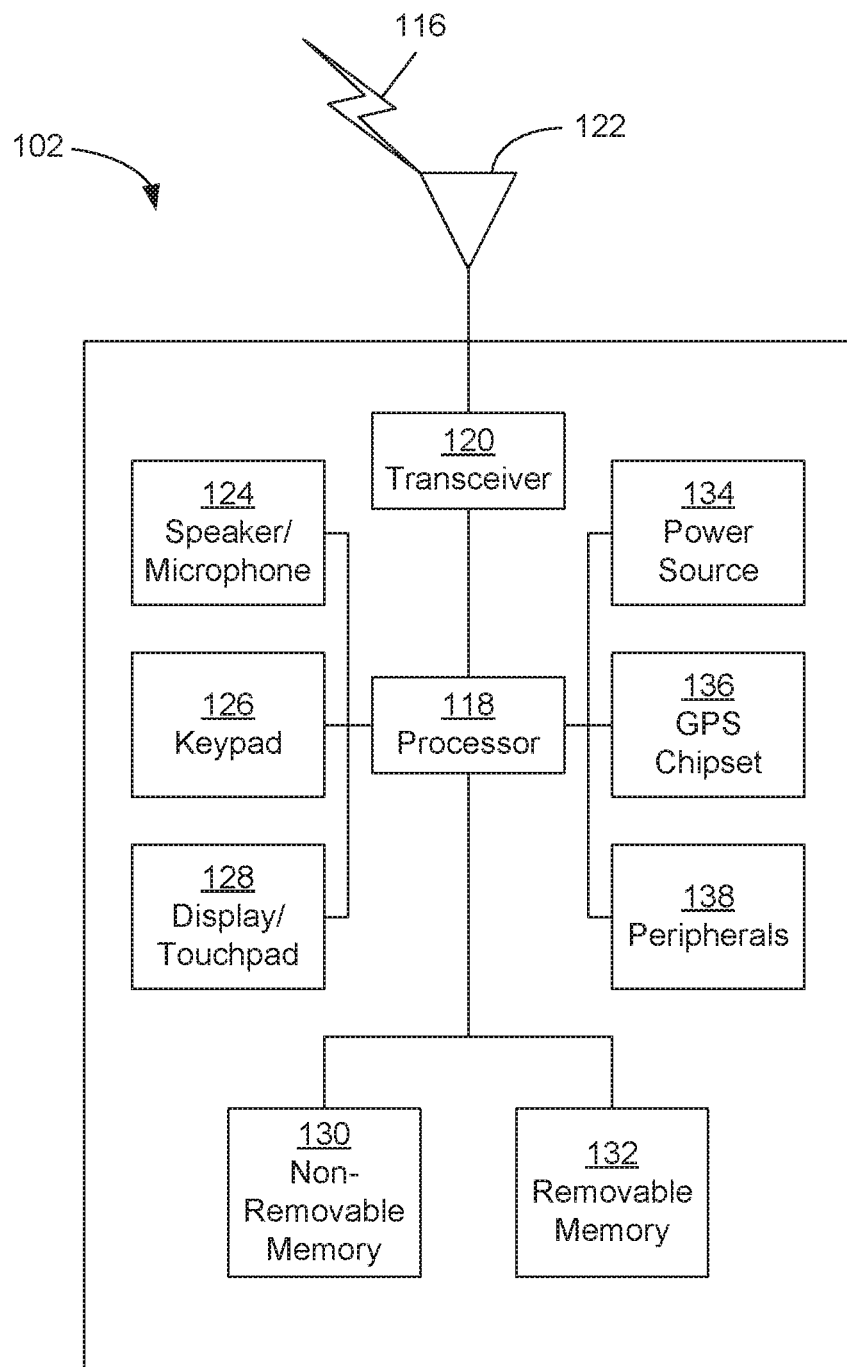
FIG. 1B is a system diagram illustrating an example wireless transmit/receive unit (WTRU) that may be used within the communications system illustrated in FIG. 1A according to an embodiment.
Figure 1C:
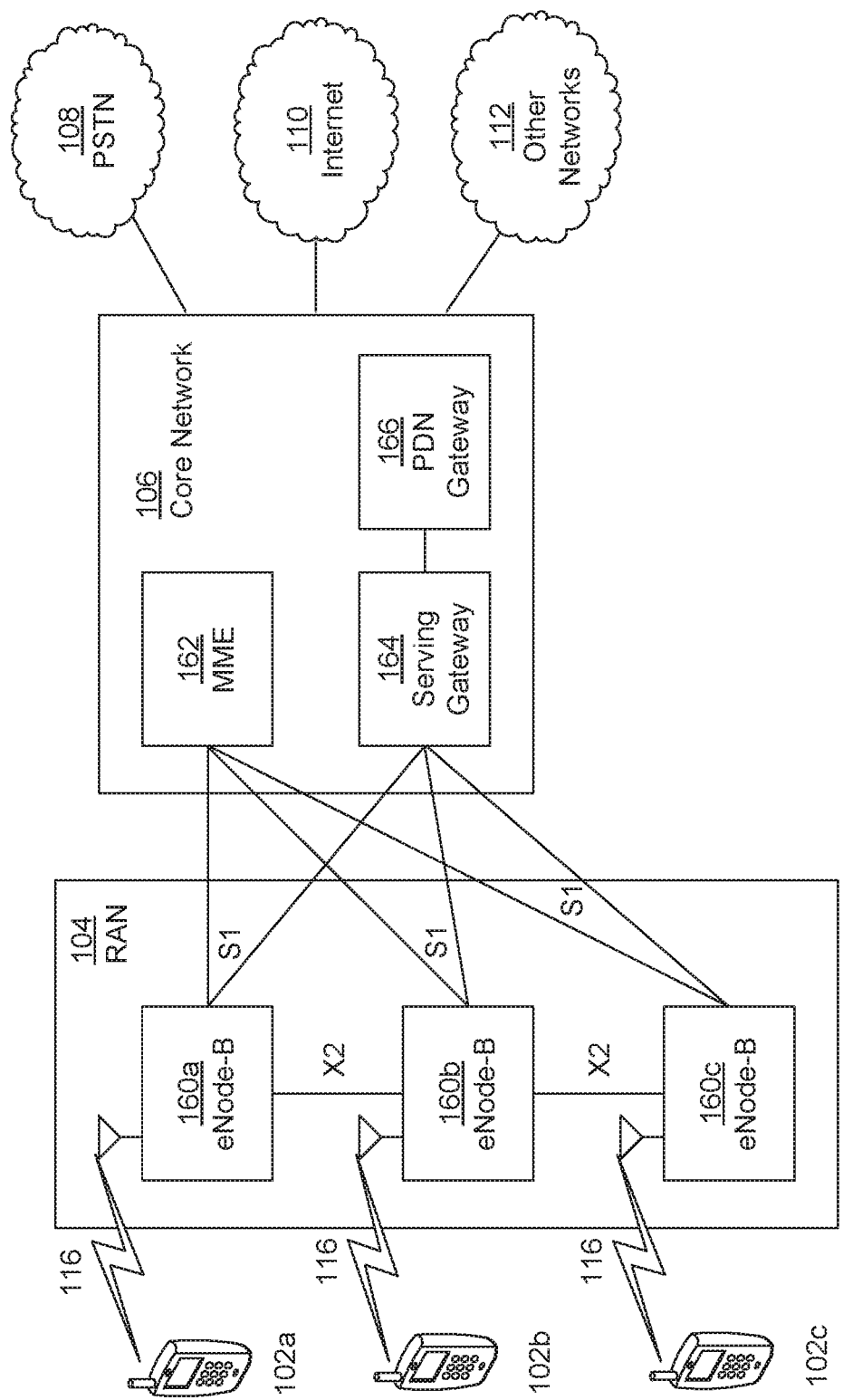
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
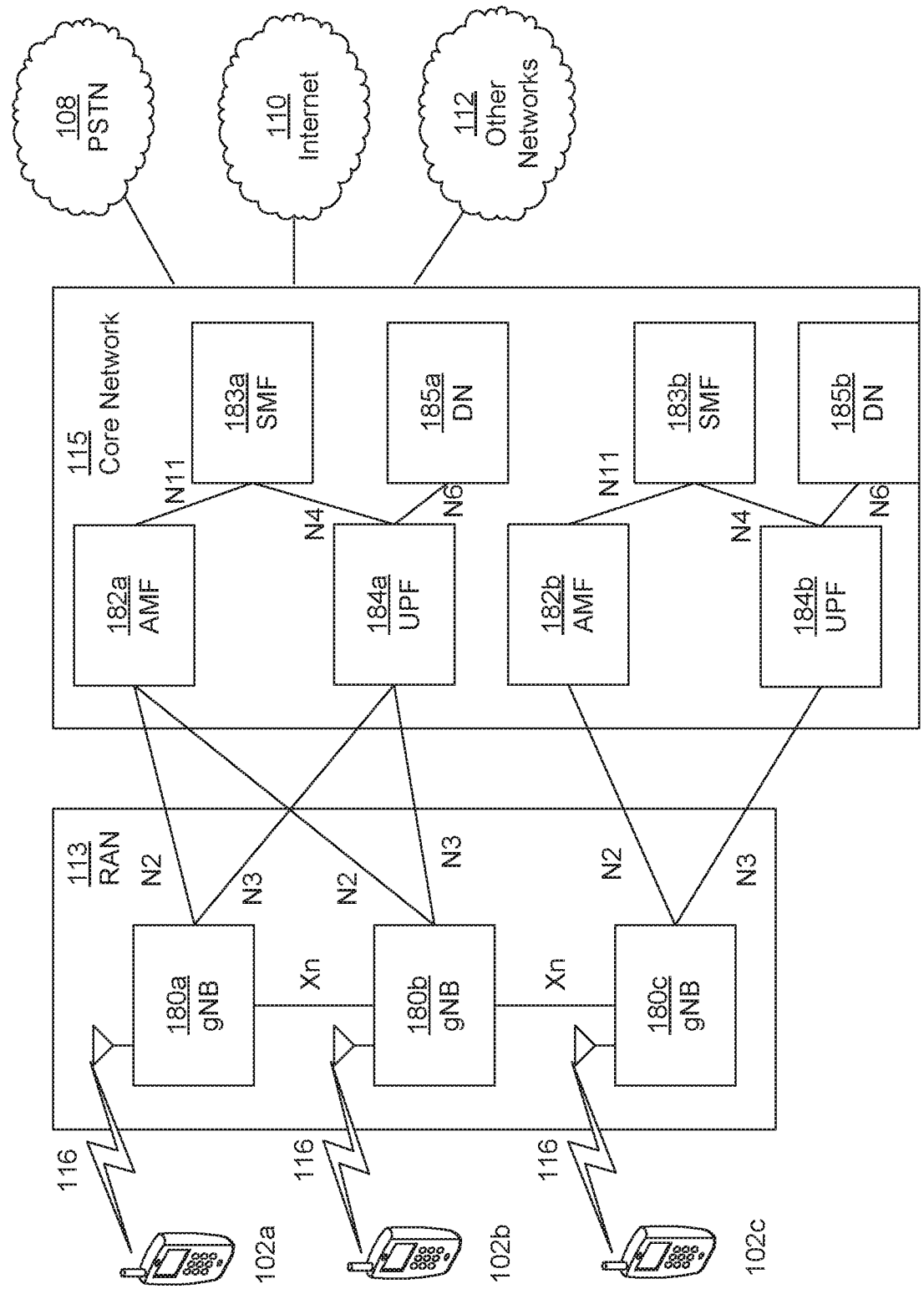
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

As noted hereinbefore, systems and methods are disclosed according to some embodiments for optimizing the streaming of dynamic point cloud sequences.

More specifically, systems and methods are disclosed in accordance with some embodiments for optimizing streaming of dynamic point cloud sequences. In some embodiments, rather than delivering, e.g., all captured point cloud data as complete snapshots in sequence, point clouds may be handled dynamically, as a constantly changing system with hierarchical rigid body transformations. In some embodiments, these transformations are continuously prioritized according to the significance of visual impacts they each cause on the point cloud appearance. In some embodiments, transformations are then communicated, from a server that is processing the captured sensor data to a client, as a continuous stream of transformations (e.g., area and rigid body transformation pairs). This precludes continuously sending updated raw point cloud data. Such example methods may optimize the data distribution for multiple scenarios.

Example point cloud collection and viewing, in accordance with some embodiments, will now be described.

Figure 2:
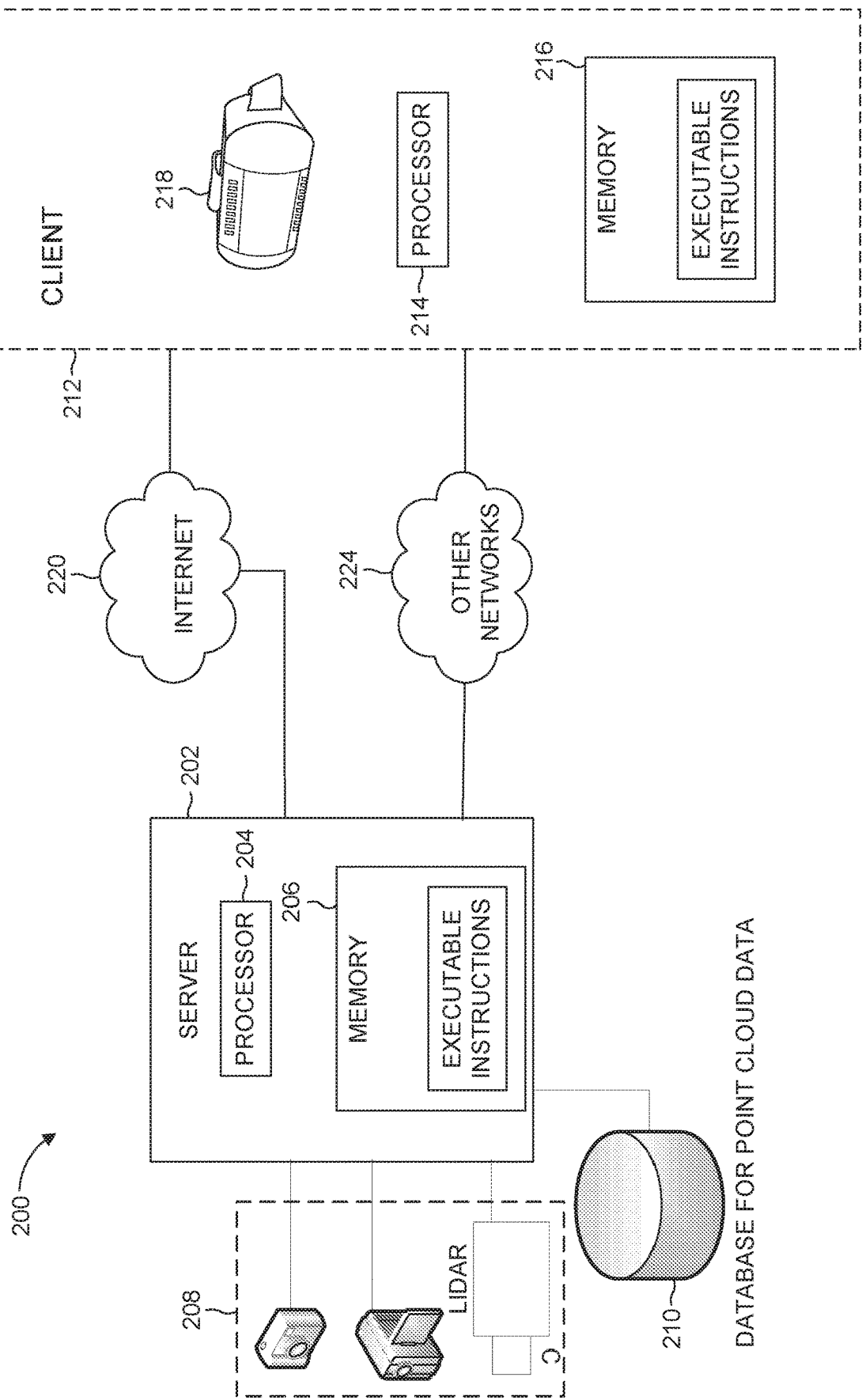
FIG. 2 illustrates an example system arrangement in which various embodiments of the present disclosure may be employed, in accordance with some embodiments.

FIG. 2 illustrates an example system arrangement 200 in which example embodiments of the present disclosure may be employed. As shown, the system arrangement 200 includes a server (e.g., a virtual reality (VR) server) 202 that may capture and process point clouds, in some embodiments. The VR server 202 may include a processor 204 and non-transitory computer-readable memory 206 that contains a plurality of instructions that are executable by the processor 204 to carry out embodiments of various methods disclosed herein. Although not explicitly shown, the processor 204 and the memory 206 may be interconnected via a bus or a similar mechanism. Coupled to the VR server 204 are a number of sensors 208, examples of which include a camera (e.g., a camera array), which may be a 3D stereo camera, an RGB-D camera, and a light detection and ranging (LIDAR) data collector. The VR server 202 is also coupled to a database 210 that may, e.g., hold point cloud data (e.g., previously-stored dynamic point cloud data, newly captured point cloud data, etc.). Although the database 210 is shown as located outside the VR server 202, in some embodiments, the database 210 and the VR server 202 may be co-located (e.g., the server 202 may include the database 210).

Further, the server 202 may be coupled to Internet 220 and other networks 222 for communication with a client 212.

The client 212 may include a processor 214 and non-transitory computer-readable memory 216 that may contain a plurality of instructions that are executable by the processor 204 to carry out embodiments of various methods disclosed herein. In addition, in some embodiments, the memory 216 may be configured to store point cloud data. However, a separate storage medium may be instead provided for that purpose. Further, as shown, the client 212 includes a VR viewing device 218. Either or both, e.g., of the server 202 and the client 212 (e.g., the VR viewing device 218 itself) may be WTRUs, described above with respect to FIGS. 1A-1D. Note that various entities shown in FIG. 2 may be coupled to each other via any suitable wired and/or wireless links and/or other intermediate elements now shown.

Example point cloud processing, in accordance with some embodiments, will now be described.

Figure 3A:
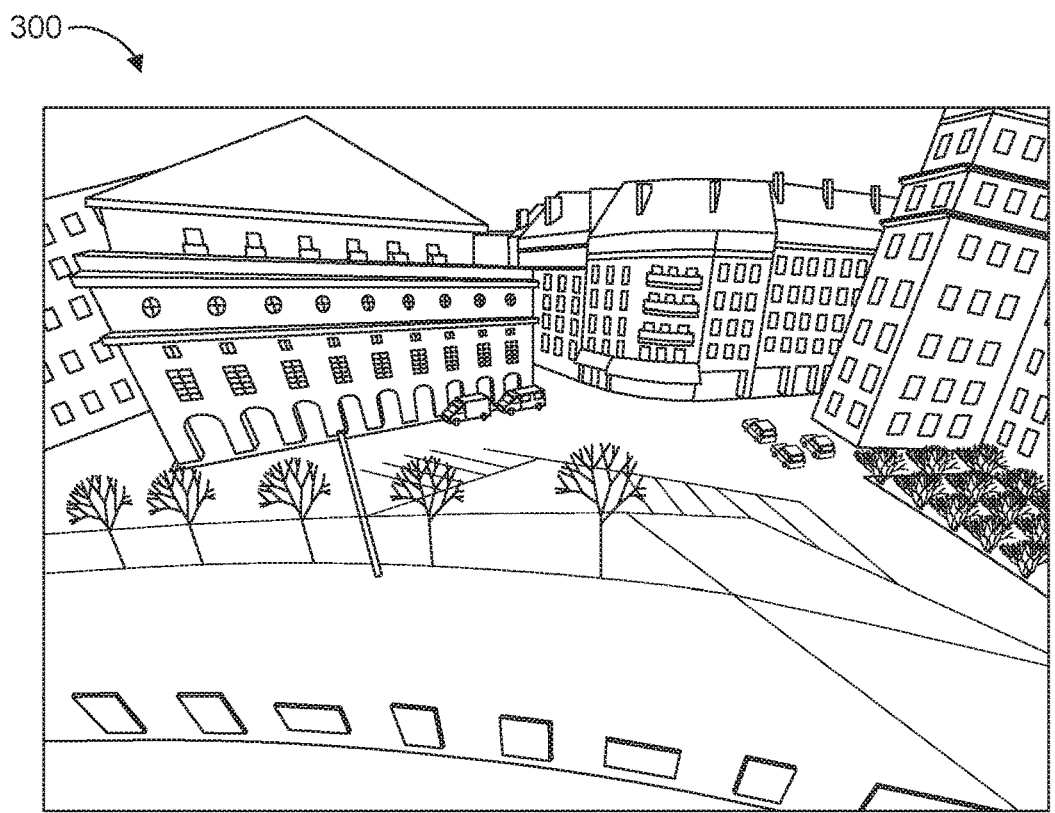
FIG. 3A illustrates an example scene that may be captured and processed, in accordance with some embodiments.

FIG. 3A illustrates an example scene 300 that may be received and processed, in accordance with some embodiments. The scene includes multiple buildings at a distance and some closer objects, imaged from an observer viewpoint with some apparent height. Further, the captured scene may have a "fixed" background and dynamic elements that move through it. If the viewer's position is dynamically altered, however, the "fixed" background may no longer fixed. Also, a "still" scene changes when, e.g., a video camera moves. As an observer viewpoint changes, perhaps by moving lower or closer relative to the buildings or other scene elements, the relative angles to the points within the point cloud may change. Point clouds may be detected in real-world scenes, generated with virtual objects, or any combination of these or other techniques as applicable. However, changing point cloud data may require rather large amount of bandwidth to transmit.

Figure 3B:
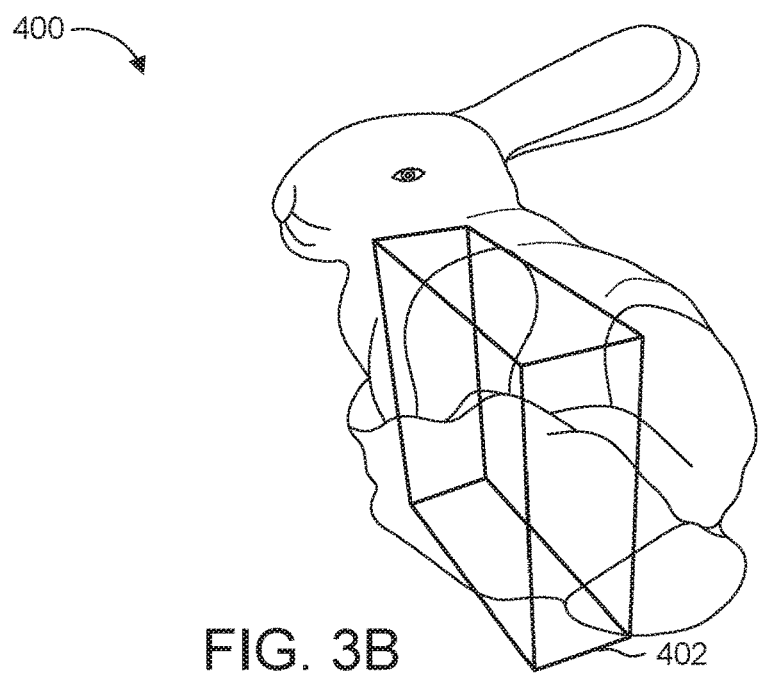
FIG. 3B illustrates an example point cloud that may be processed, in accordance with some embodiments.

FIG. 3B illustrates an example point cloud (image) 400 that may be processed, in accordance with some embodiments. Although not explicitly shown in FIG. 3B, the point cloud image 400 will normally contain many points within the point cloud. The points represent three-dimensional (3D) coordinates in which a portion of an object 402 has been detected to exist. Such detection may occur using 3D sensors, such as light detection and ranging (LIDAR), stereo video, and RGB-D cameras. Further, the point cloud data may include 3D location and radiance image data or volume pixels (voxels).

As VR and augmented reality (AR) platforms are developing towards mass adoption by a larger number of consumers, demand for high resolution 3D content will increase. A traditional de facto standard for such full 3D content has been polygonal 3D graphics, manually produced by modeling, and rendered with tools and techniques used for creating real-time 3D games. However, emerging mixed reality (MR) displays and content capture technologies, such as VR head mounted displays (HMDs), AR HMDs, RGB-D sensors, and light field cameras, have set new requirements for fully immersive 3D content production and distribution.

Beyond MR driving the development of reality capture technologies, in the near future, human-computer interactive systems can be expected to become more spatially aware. Environment sensing technologies that enable structural understanding of the environment are being increasingly embedded with smart home environments, automotive systems, and mobile devices. These spatially aware systems collect point cloud data from the environment, and so may require, for certain applications, efficient tools for communicating the environmental data in scenarios where such spatial data is to be transmitted across multiple systems and services.

Traditional manual 3D modeling of 3D elements is often insufficient for capturing fine nuances of real world appearance of environments and humans, leading to the development of newer techniques for capturing fully 3D content. Such recent techniques include, e.g., use of multi-view camera stages (see, e.g., Collet, Alvaro et al., "High-quality streamable free-viewpoint video," ACM Transactions on Graphics (TOG), 34.4: 69, 2015), multiple RGB-D sensors (see, e.g., Orts-Escolano, Sergio et al., "Holoportation: Virtual 3d teleportation in real-time, Proceedings of the 29th Annual Symposium on User Interface Software and Technology, ACM, pp. 741-754, 2016), and also the use of light field cameras. With many of these approaches, the capture system produces sequences of dynamic point clouds with temporally varying structure. When these emerging methods, that enable dynamic capture of real-world scenes as point clouds, become widely used, approaches for efficiently distributing sequences of dynamic point cloud data will be increasingly important (see, e.g., Thanou, Dorina et al., "Graph-based motion estimation and compensation for dynamic 3D point cloud compression," Image Processing (ICIP), 2015 IEEE International Conference, pp. 3235-3239, 2015).

Raw capture of real world scenes in a manner that preserves both the image quality and depth/structure information places notable demands on capture and distribution systems due to the typically large sizes of the captured data. An example method in accordance with some embodiments for distributing sequences of dynamic point cloud data produced with dynamic sensors may adapt to the varying throughput of the distribution channel and may render performance in a manner which prioritizes the content updates based on the relative visual importance. Visual importance may differ from client to client; and accounting for this during the data distribution can improve the overall quality of experience for users.

In some embodiments, a possible optimization may include not treating a sequence of point cloud data merely as snapshots of a complete environment geometry for moments in time, but instead as continuum of changes in the environment geometry that can be streamed to the client, prioritizing those changes that have more significant visual changes over changes that are more subtle. Rather than streaming 'full frames' of environment geometry, transformations of sub-regions of geometry may be instead streamed. In some embodiments, prioritization of streamed changes depends on an amount of visual impact which the transformation results for a particular client, which may be a factor of a size of an area of geometry impacted by the transformation and an amount of resulting deformation (e.g., an amount of transformation). Furthermore, the visual impact is subjective to individual clients, as the visual impact may depend on the client's observation of the geometry transformation (e.g. how far from the client the transformation takes place).

Considering a video captured scene with a fixed background and dynamic elements that move through the video captured scene, when an observer's viewpoint is altered, the fixed background is no longer fixed in place, relative to the observer.

Approaches for optimizing data amounts that may, in some embodiments, be required by the point cloud sequences are based on transforming point clouds into voxel grids using, for example, octree space partition (see, e.g., De Gueiroz, Ricardo et al., "Compression of 3d point clouds using a region-adaptive hierarchical transform," IEEE Transactions on Image Processing, 25.8: 3947-3956, 2016) or extensive off-line processing of pre-captured data in order to extract full point clouds which are then reduced to a set of full key frame point clouds with delta frames between (see, e.g., Collet, Alvaro et al., "High-quality streamable free-viewpoint video," ACM Transactions on Graphics (TOG), 34.4: 69, 2015).

However, none of these methods is understood to take into consideration that, in data captured from normal everyday environments, most of the objects are either static or in motion that can be modeled as rigid body transformation. Furthermore, point cloud data can be considered hierarchical.

In accordance with some embodiments, the spatially hierarchical nature of a point cloud (e.g., an environment), includes multiple sub-objects that can be inspected with different levels of details. Similarly, in some embodiments, motions may be broken down hierarchically from the motion of the entire object, down to motion of parts making up that object and then down to motion of individual points that might actually be caused by a sensor noise (rather than, e.g., being an actual motion). In some embodiments, hierarchical consideration of the point cloud also relates to how changes involving large areas and/or with large amount of movement are typically more visible to a viewer than subtler and smaller changes (e.g., changes related to sensor noise). Thus, according to some embodiments, point cloud updates can be considered hierarchical in their priority: it is more important, for example, to visualize larger visible changes than smaller more subtle changes.

A method and system are disclosed herein, in accordance with some embodiments, to consolidate 3D point cloud data by representing the 3D point cloud data as a constantly changing (e.g., time-varying) system with hierarchical rigid body transforms prioritized based on a visual impact on the overall point cloud appearance.

As noted hereinbefore, systems and methods are disclosed in accordance with some embodiments for optimizing streaming of dynamic point cloud sequences. In some embodiments, rather than delivering, e.g., all captured point cloud data as complete snapshots in sequence, point clouds may be handled dynamically, as a constantly changing system with hierarchical rigid body transformations. In some embodiments, these transformations are continuously prioritized according to the significance of visual impacts they each cause on the point cloud appearance. In some embodiments, transformations may be then communicated, from a server that is processing the captured sensor data to a client, as a continuous stream of transformations (e.g., area and rigid body transformation pairs). These example techniques in accordance with some embodiments may preclude continuously sending updated raw point cloud data. Such methods may optimize the data distribution for multiple scenarios.

Figure 4:
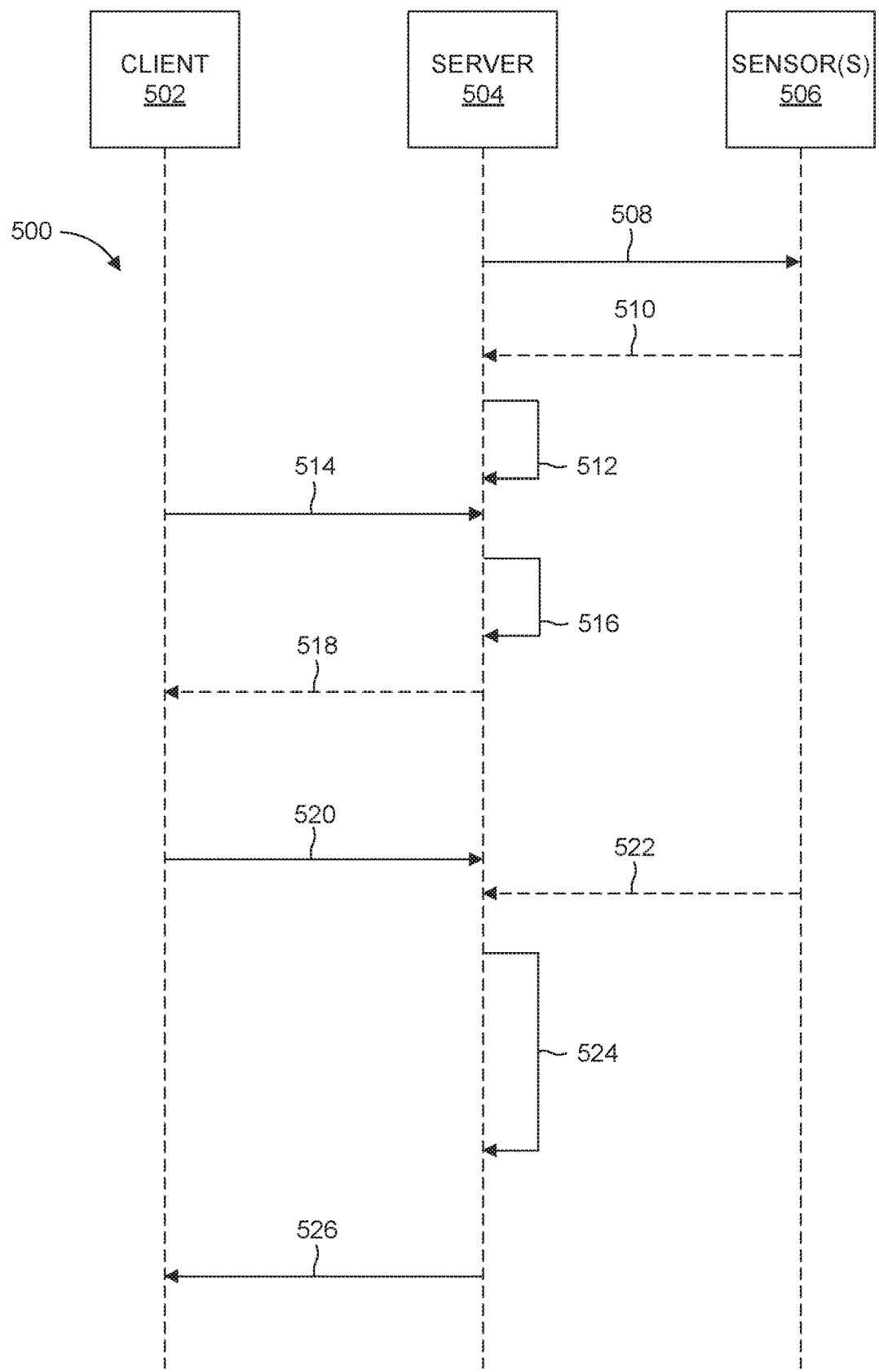
FIG. 4 illustrates a message sequence diagram, in accordance with some embodiments.

FIG. 4 illustrates an example message sequence diagram 500, according to some embodiments. In one example method in accordance with some embodiments and illustrated in FIG. 4, a server captures point cloud data from sensors and streams the data to a client in an (e.g., optimized) format where, instead of sending raw point cloud data, streams of transformations at different levels of point cloud sub-regions, approximating the dynamic changes in the captured point cloud, are instead sent to the client. FIG. 4 illustrates an overview of an example sequence of operations performed by the client and the server, as well as messaging taking place between the server and the client in an example typical use session, according to some embodiments.

Namely, referring to FIG. 4, at 508, a server 504 may send any (e.g., suitable) message(s) to initialize one or more sensors 506 to start capturing point cloud data. At 510, the sensor(s) 506 may communicate a first (e.g., an initial) point cloud (data) to the server 504. The point cloud data includes three-dimensional (3D) data. At 512, the server 504 may wait for a request from a client 502 for point cloud data streaming. Although not explicitly shown in FIG. 4, while waiting for the client request, the server 504 may continue to receive new point cloud data captured by the sensor(s) 506. At 514, the server 504 may receive the client request for the point cloud data streaming. In response to the client request, at 516, the server 504 may store a current (e.g., the latest) point cloud received from the sensor(s) 506 as a reference point cloud. Further, at 518, the server 504 may communicate that reference point cloud to the client 502.

At 520, the client 502 may provide (as, e.g., a continuation of the point cloud data streaming request) to the server 504 a current client location relative to the reference point cloud. As will be described in more detail, the current client location will be used, in some embodiments, to determine a distance used in prioritizing areas within a given point cloud, e.g., in relation to a client viewpoint. Note that, in some embodiments, the current client location could be provided as a part of or concurrently with the client request for the point cloud data streaming executed at 514. Further, in some embodiments, it may be possible for the client 502 (e.g., when the client 502 already knows an initial viewpoint to be used without first having received, e.g., the full reference point cloud) to signal its viewpoint along with the point cloud streaming request so that the server 504 may be able to adjust a resolution of the reference point cloud accordingly.

At 522, the server 504 receives a second (e.g., current, e.g., newly captured) point cloud (data) from the sensor(s) 506. At 524, the server 504 is configured to process the reference point cloud and the second point cloud accordingly to determine (i) 3D transformation(s) (e.g., rigid body transformation(s) that approximate change(s) in the second point cloud from the reference point cloud), should these exist, and/or (ii) points representative of the change(s) that are to be removed and/or added to modify the reference point cloud, such as, e.g., to substantially reproduce (e.g., replicate) deviation(s) between the reference point cloud and the second point cloud. Once the transformation(s) and/or the points are determined, the server 504 may update the reference point cloud stored at the server 504.

Further, at 526, the server 504 may transmit to the client 502 indication(s) of area(s) in the reference point cloud to be transformed using, e.g., the determined transformations (if they can be determined) or, e.g., the points to be added and/or removed from the reference point cloud, so that the client 502 can update a local copy of the reference point cloud at the client side. This way, the client 502 can make update(s) to reflect the changes that have occurred in newly captured point cloud rather than continuously receiving from the server a new full set of raw updated point cloud data.

The example overall process illustrated in FIG. 4 will now be described in more details in accordance with some embodiments.

Figure 5:
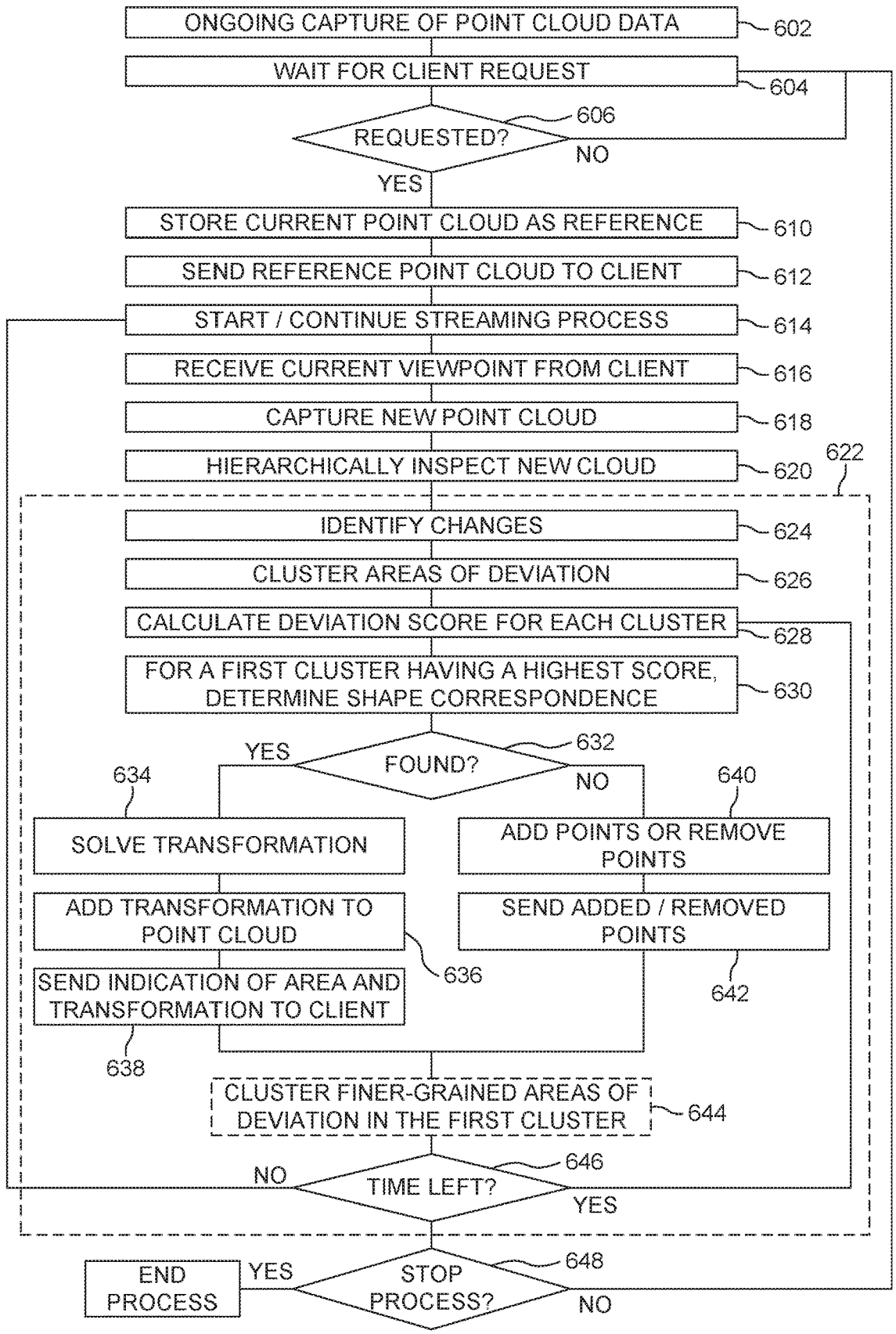
FIG. 5 is a flow chart of an example method of processing point cloud data, according to some embodiments.

FIG. 5 is a flow chart 600 illustrating an example method of processing point cloud data, according to some embodiments. In some embodiments, the example method of FIG.

5 may be carried out by a server, such as, e.g., the server 504 of FIG. 4, or the server 202 of FIG. 2.

As shown in FIG. 5, at step 602, the server may (e.g., continuously) receive point cloud data captured by sensors. At 604, the server waits for a viewing client to request a point cloud data stream. At step 606, the server determines whether a client request has been received. If the client request has been received, at step 610, the server stores the current point cloud as a reference point cloud and, at step 612, sends a current point cloud to the client. At step 614, the server starts (or, e.g., continues) a process for streaming point cloud data to the client. In some embodiments, the process may be executed for each new point cloud instance captured from the sensors and received at the server.

The process starts (or, e.g., continues) at step 616, in which the server receives a current viewpoint from the viewing client to be used for rendering a given point cloud in relation to the reference point cloud. In some embodiments, the client viewpoint is used for determining what changes in the given point cloud are important for the client, with one measure of importance being, e.g., determined by an amount of visual impact a given change causes from the client viewpoint perspective.

At step 618, the server receives a newly captured point cloud. Then, at step 620, the server hierarchically inspects the newly captured point cloud in comparison with the reference point cloud, in order to isolate areas that have changed. As shown in FIG. 5, in some embodiments, the step 620 may include a sub-process 622 having a number of further sub-steps.

More specifically, at sub-step 624, the server identifies areas that have changed. In some embodiments, a purpose is to identify which areas of the captured point cloud have changed since the most recent update, in order to approximate a transformation that best estimates changed point locations within clusters corresponding to the changed areas. As such, sub-step 626 involves clustering areas that deviate between the reference point cloud and the captured point cloud. In some embodiments, clustering includes isolating areas of a recently-captured point cloud that differ from the reference point cloud.

At sub-step 628, the server may determine (e.g. calculate, as in FIG. 5) a respective score for each cluster, where, in some embodiments, the respective score indicates an importance of a visual impact of the deviation. In some embodiments, such importance may be, e.g., calculated as a weighted sum of a size of the deviating area, an amount of deviation, and a distance of the deviating area from the current (virtual) viewpoint that the client is using to inspect the point cloud on the client side, although of course this is an example and other formulations may be used.

At sub-step 630, for a first cluster having a highest score (and hence an example of highest priority), the server determines a shape correspondence between the two point clouds (i.e., the captured point cloud and the reference point cloud) near an area where the deviation has been clustered. As a general matter, according to some embodiments, when an area with a deviation is first detected, one may generally assume that the deviation is caused, e.g., by a segment that has moved. In some embodiments, in order to find where that segment has moved, it may be necessary to inspect a larger area from the point cloud representing the second time step. If the deviation is caused by a rigid transformation of an element, the element may be relatively close to its original location. Hence, in some embodiments, the shape correspondence (e.g., matching) is performed to an area that may be slightly larger relative to the area of deviation. In some embodiments, a size of the larger area may be controlled by inspecting a length of time between frames an expected motion speed of elements. Then, at sub-step 632, if, e.g., a similar shape is found, at sub-step 634, the server may determine (e.g., solve for) a transformation that approximates the deviation between the reference point cloud and the captured point cloud. At sub-step 636, the server may then add (e.g., apply) the transformation to the reference point cloud and, at sub-step 638, sends an indication of the area having the deviation and the transformation to the client.

In some embodiments, the area of deviation may be sent as bounding volume coordinates encapsulating that area. In some embodiments, the transformation may be sent as a transformation matrix, such as, e.g., a 3 by 4 transformation matrix. As a general matter, a transformation matrix is a standard way of describing transformation in linear algebra and computer graphics, in which a single matrix defines 3D rigid body transformation that includes a rotation and translation. New point locations can then be obtained by multiplying point coordinates (to be transformed) with the transformation matrix. See, e.g., an article at en.wikipedia.org/wiki/Transformation_matrix.

If a similar shape is not found at sub-step 632, the sub-process 622 moves to sub-step 640, in which the server determines points to be removed from and/or added to the reference point cloud according to the captured point cloud and then, at sub-step 642, streams the added and/or removed points to the client.

At sub-step 644, in some embodiments, the server may isolate additional finer-grained areas (also referred to herein, for example, as "sub-areas") that have not yet been addressed from the cluster just processed. These unaddressed areas may still have, e.g., a significant amount of deviation. In some embodiments, the server may cluster those sub-areas into new deviation clusters and calculate an importance score (e.g., or other metric) for each of those new clusters as described above.

At sub-step 646, responsive to a determination of time, processing, and communication bandwidth resource availability at the server and/or client side, the server may continue processing and partitioning the remaining clusters. For example, the server may return to sub-step 628, and continue processing of the next yet unprocessed cluster (e.g., from within a combination of the previously formed clusters and the new clusters corresponding to the just-processed sub-areas) with a next highest importance score, and hence (e.g.) next highest priority. According to the example, if, however, the server determines there is no more processing budget left, the sub-process 622 ends, and the processing may return, e.g., to step 614.

On the other hand, if at step 648, a determination is made that, e.g., the server or client signals request to terminate the streaming, then the process may end. Otherwise, the process may return to step 604.

The example methods and systems proposed herein in accordance with some embodiments, as implemented in some embodiments and generally illustrated in the examples of FIGS. 4 and 5, may enable efficient streaming of sequences of dynamic point cloud data. In some embodiments, the amount of data that may be needed to be transmitted may be, e.g., optimized by considering changes in the point cloud data as, for example, continuous hierarchical rigid transformations that are prioritized according to a visual impact for a client viewing the data. In some embodiments, this may, e.g., ensure that the bandwidth and processing power available are consumed for content updates that, e.g., may have the biggest impact on the quality of user's experience.

In contrast with some other approaches for point cloud optimization, example methods and systems disclosed herein according to some embodiments may generally operate, e.g., well in typical un-controlled capture environments, such as ad hoc capture of action for indoor or outdoor environments, where most of the geometry is static and transformations typically can be approximated with rigid body animation, e.g., individual objects that are in motion.

As spatial sensing is being increasingly embedded with smart environments, automotive systems and mobile devices, the example approaches proposed herein, in accordance with some embodiments, may provide an efficient method for streaming data between systems and services sharing environmental data. In most example cases, the environmental data can be expected to include both static environment geometry and rigid objects in motion in that environment. For such cases, in some embodiments, the example compression approaches described here in accordance with some embodiments may be well suited.

In accordance with some embodiments, changes may be prioritized according to a current viewpoint of a user, relative to point cloud data, and delivered hierarchically so that, e.g., each area with a change can have further sub-areas describing changes in the data at different levels. In case of the point cloud data, due to the sensor noise, each frame may have constant change. Advantageously, with the approach proposed herein, in accordance with some embodiments, only the most important changes are communicated within the limits of the available bandwidth.

Figure 6:
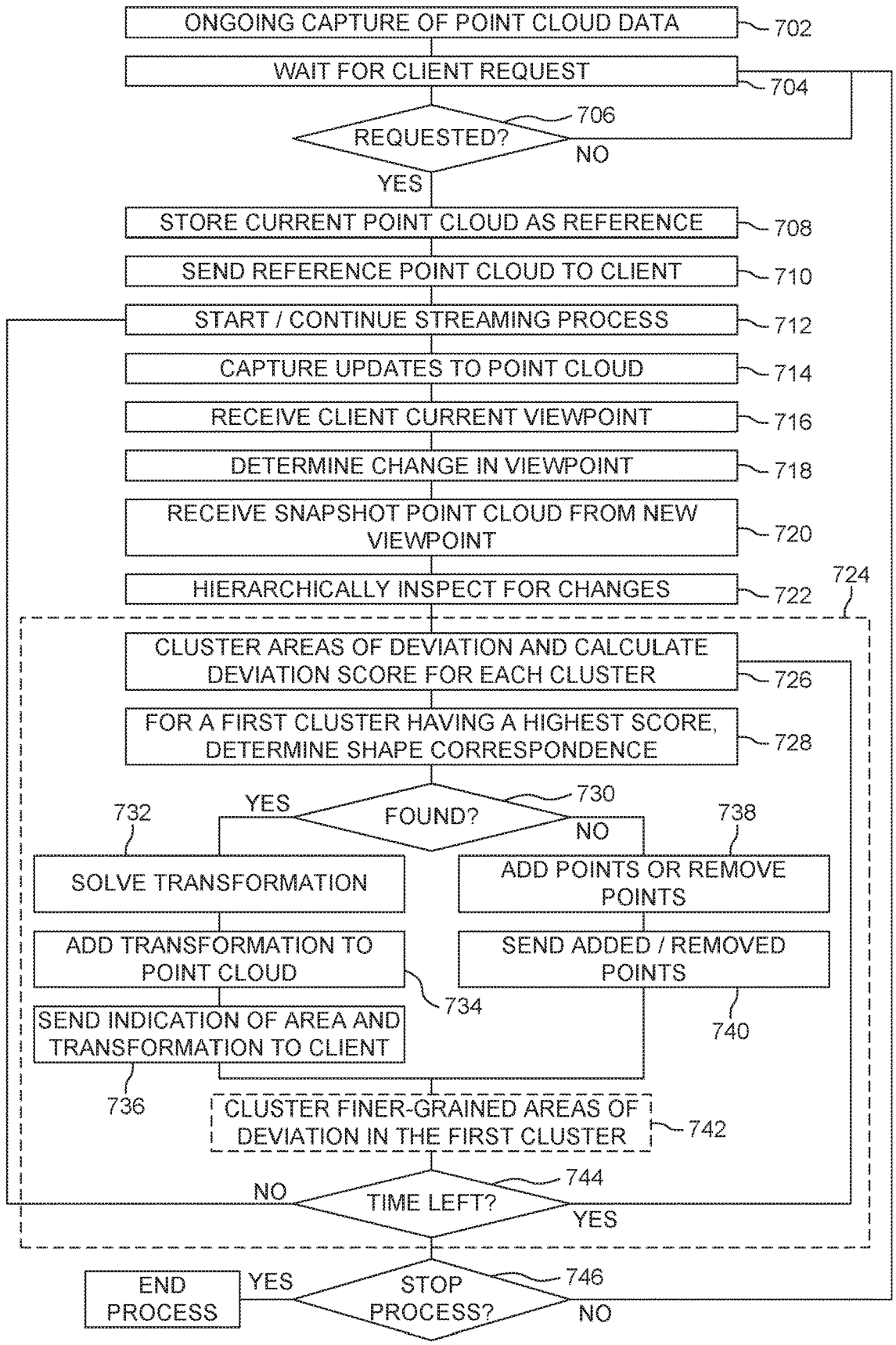
FIG. 6 is a flow chart of another example method of processing point cloud data, according to some embodiments.

FIG. 6 illustrates a flow chart of another example method 700 of processing point cloud data, according to some embodiments. In some embodiments, the example method of FIG. 6 may be carried out by a server, such as, e.g., server 504 of FIG. 4, or server 202 of FIG. 2. In some embodiments, the example method of FIG. 6 may be applicable in cases in which, for instance, the server may inspect an area of a point cloud visible to a client, e.g., at a given time instance (e.g., a snapshot point cloud, as in step 720), e.g., instead of inspecting a full point cloud for temporal changes, or between time steps.

As shown in FIG. 6, at step 702, the server may (e.g., continuously) receive 3-D data representative of, for instance, user environment. The 3D data may be collected by sensors, examples of which include RGB-D, LIDAR, and/or combination of those and/or other sensors.

At 704, the server waits for a client joint request for (e.g., here) point cloud data and radiance image data, and at step 706, the server determines whether the client request has been received. If the client request has been received, at step 708, the server stores the current point cloud (3D data captured by the sensors) and radiance image data as a reference point cloud, and at step 710, the server also sends the current point cloud and radiance image data to the client.

At step 712, the server starts (or, e.g., continues) a process for streaming point cloud data to the client. In some embodiments, the process may be executed for each new point cloud instance captured from the sensors and received at the server.

The process starts (or, e.g., continues) at step 714 in which the server receives and stores captured (e.g., sensor collected) updates to the point cloud data (such as, for example, due to captured images of a real world scene changing) and, e.g., updates (if any) to the radiance image data. In general, in some embodiments, point cloud data may be in the form of, e.g., raw geometry and color for that geometry may come from, e.g., radiance images that may be distributed, e.g., separately. However, in some embodiments, the geometry and the color associated therewith may be instead included in the point cloud data.

At step 716, the server receives a current viewpoint of the client (e.g., within an immersive scene). Responsive to the receipt of the client's current viewpoint, at steps 718-720, the server may determine a change in view point relative to the view point associated with the reference point cloud and receive a snapshot point cloud (of the captured scene) from this new perspective view/view point. The example of FIG. 6 may provide for the processing to be, e.g., optimized by limiting an inspection of a point cloud temporal variation to be performed only for area(s) currently seen by the client.

At step 722, the server hierarchically inspects the snapshot point cloud, or a current newly captured point cloud, relative to the reference point cloud, in order to isolate areas that have changed. As shown in FIG. 6, in some embodiments the step 722 may include a sub-process 724 having a number of further sub-steps.

More specifically, at sub-step 726, the server identifies areas that have changed, and, e.g., similar in certain aspects to the sub-process illustrated in FIG. 5, the server may cluster the areas that deviate between the reference point cloud and the snapshot point cloud, at sub-step 726. Also, the server may determine (e.g. calculate) a respective score of each cluster, where, in some embodiments, the respective score indicates an importance of a visual impact of the deviation. In some embodiments, such importance may be, e.g., calculated as a weighted sum of a size of the deviating area, an amount of deviation, and a distance of the deviating area from the current viewpoint of the client.

At sub-step 728, for a first cluster having a highest score, and hence, e.g., an example of a highest priority, the server determines a shape correspondence between the two point clouds (i.e., the snapshot point cloud and the reference point cloud) where the deviations have been clustered. Then, if a similar shape is found (e.g., detected), at sub-step 730, the server may determine (e.g., solve for), at sub-step 732, a transformation that approximates the deviation between the reference point cloud and the snapshot point cloud. At sub-step 734, the server then adds (e.g. applies) the transformation to the reference point cloud and sends an indication of the area having the deviation and the transformation to the viewing client, at sub-step 736. These sub-steps are described in more detail in the description of FIG. 5.

If a similar shape is not found at sub-step 730, the sub-process moves to sub-step 738, in which the server determines points to be removed and/or added from the reference point cloud according to the snapshot point cloud and, at sub-step 740, streams the added and/or removed points to the client, rather than, e.g., the entire set of point cloud data.

At sub-step 742, in some embodiments, the server may isolate yet-unaddressed additional finer-grained areas (also referred to herein, for example, as "sub-areas") from the cluster that was just processed. In some embodiments, the server may cluster those sub-areas into new deviation clusters and calculate an importance score (e.g., or other metric) for each of those new clusters as described in connection with FIG. 5.

At sub-step 744, if a processing budget still allows (e.g., processing time reserved for processing one instance of captured point cloud, bandwidth available for sending transformations or estimated processing capacity at the client and/or server side), the server may continue processing and partitioning the remaining clusters. For example, the server may return to, e.g., sub-step 728, and continue processing of the next yet unprocessed cluster (e.g., from within a combination of the previously formed clusters and the new clusters corresponding to the just-processed sub-areas) with a next highest importance score, and hence, e.g., a next highest priority. If, however, the server determines there is no more processing budget left, the sub-process 724 ends, and the processing may return to step 712.

On the other hand, if at step 746, a determination is made that, e.g., the server or client signals a request to terminate the streaming, then the process may end. Otherwise, the process may return to step 704.

Figure 7A:
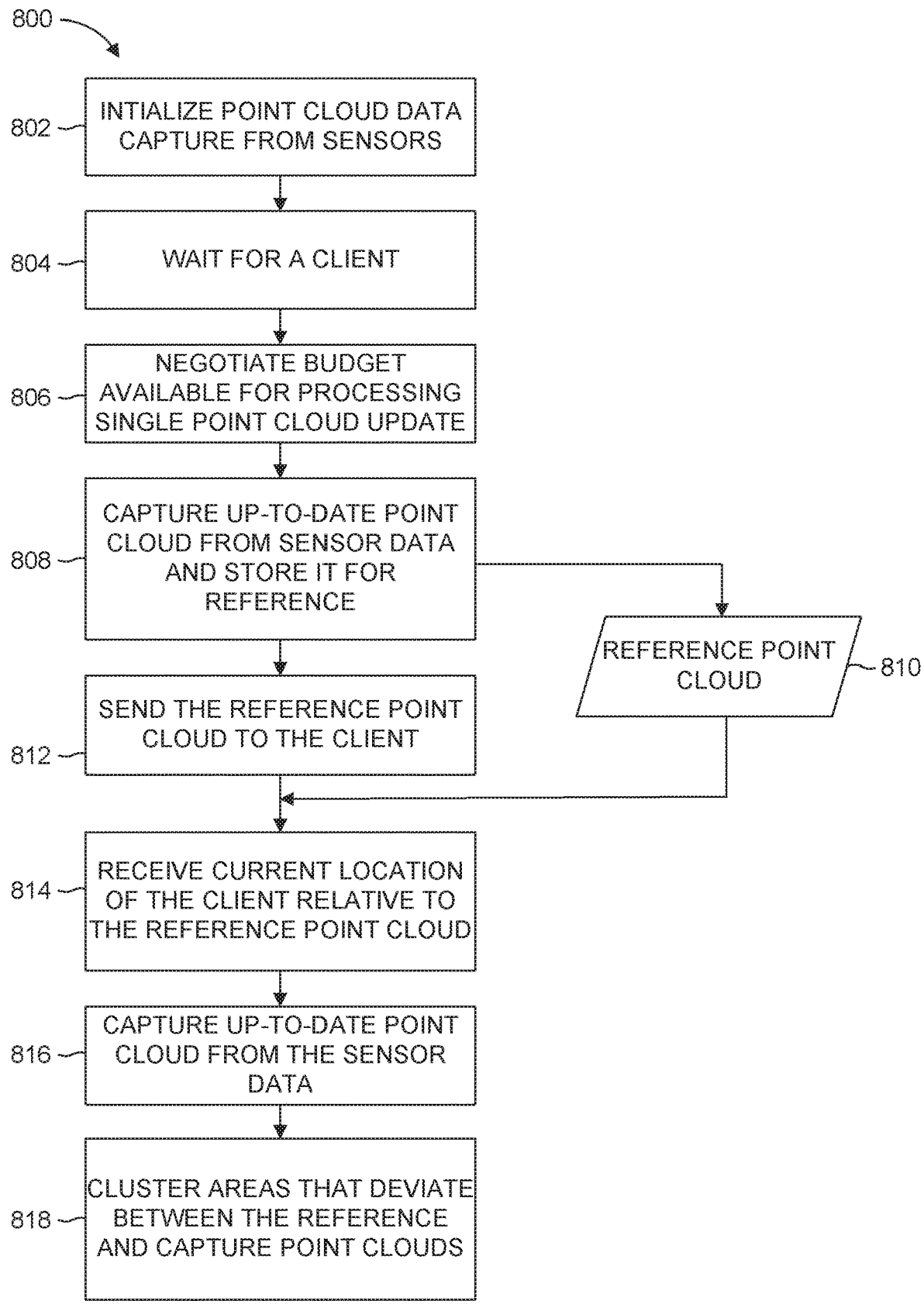
FIGS. 7A and 7B are respective flow charts of yet another example method of processing point cloud data, according to some embodiments.
Figure 7B:
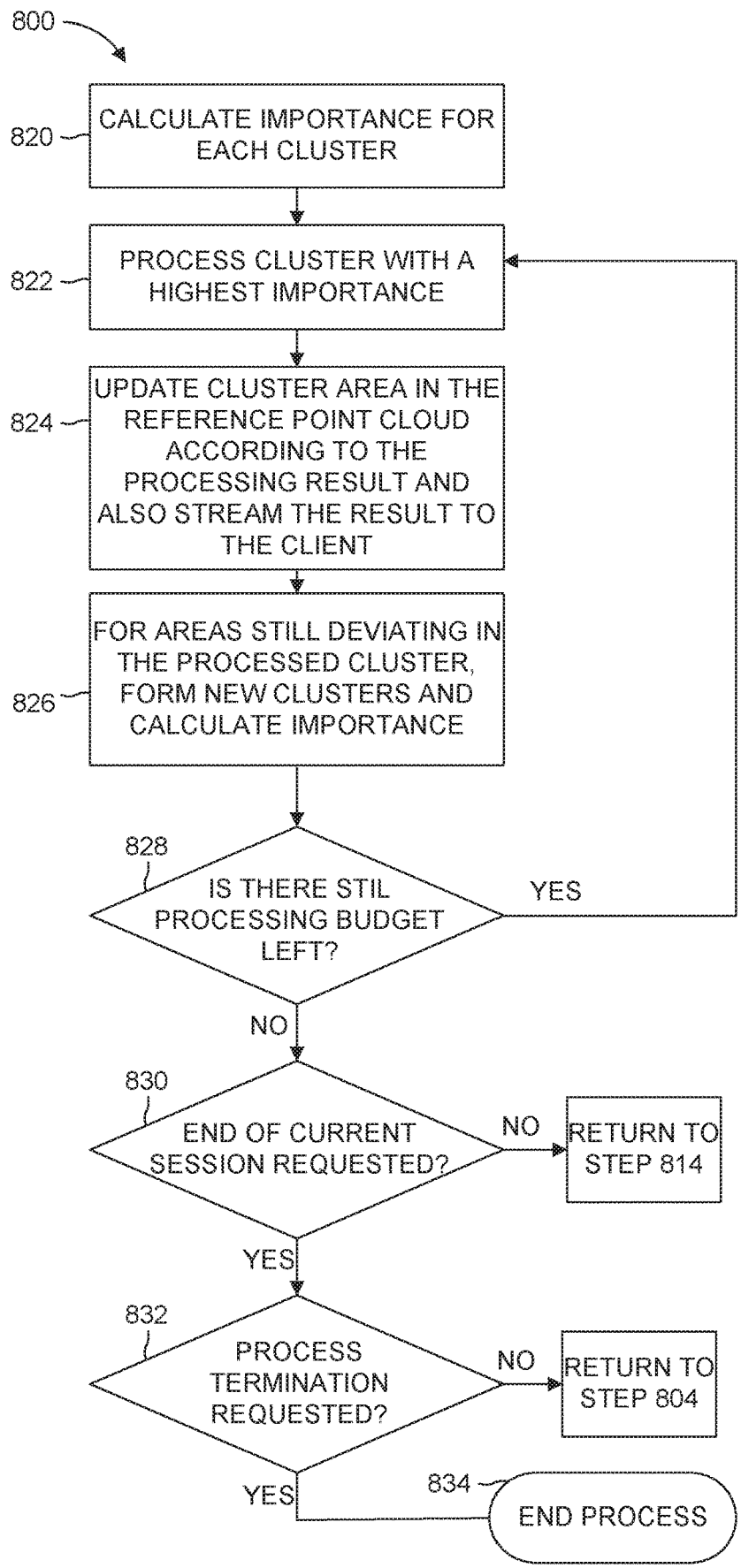

FIGS. 7A and 7B are respective flow charts of another example method of processing point cloud data, according to some embodiments. Note that FIG. 7B is a continuation of the method steps shown in FIG. 7A. Together, FIGS. 7A and 7B illustrate an example process executed by (e.g.) a server that may be responsible for capturing a point cloud resulting from collection of sensor data from the sensors available for environment sensing. The sensor can be any of, for example, RGB-D sensor(s), camera array(s), stereo camera(s) producing depth information, LIDAR(s), etc. At the start of the process, at step 802, the server initializes the sensors to be ready to produce raw sensor data and, at step 804, awaits for a client to request an (e.g., optimized) point cloud stream.

In some embodiments, when a client requests to receive the (e.g., optimized) dynamic point cloud stream from the server, at step 806, first the server and the client may negotiate an appropriate processing budget. In some embodiments, processing budget defines how much time and bandwidth can be used for streaming data for each single dynamic point cloud update step from the server to the client. In some embodiments, in order to negotiate the budget to be used, the bandwidth of the network connection between the client and the server can be tested. In this regard, in some embodiments, the client can define the (e.g., required) update frame rate, which, e.g., defines how much time the server has to process each update step. Also, in some embodiments, the performance of the client can be tested to define an approximate number of transformations the client can handle during each update step. In some embodiments, the client can also approximate how many point cloud points the client can process and render during each display update cycle.

When the budget for processing has been defined, at step 808, the server may capture up-to-date point cloud data using raw sensor data and store the up-to-date point cloud data as a reference point cloud at step 810. At step 812, the server may also send the reference point cloud to the client. In some embodiments, the server may reduce the reference point cloud complexity (e.g., using a suitable compression technique) when storing the reference point cloud, in case, e.g., the data size is too high for the server or the client to handle in real-time. Note that an initial reference frame may not depend on the client viewpoint.

In addition to sending a full reference point cloud at the beginning of the session, in some embodiments, it is possible to send new reference point clouds periodically, e.g., in order to avoid data degradation caused by cumulatively approximating the changes in the point cloud as hierarchical transformations. New reference point clouds can be sent using, e.g., a fixed interval, such as a new full reference point cloud being sent every Nth update step. In some embodiments, other methods could be used to determine that the magnitude of cumulative changes warrant sending a new reference point cloud. Such methods can, for example, ascertain the overall change between the scene currently captured and the scene sent earlier as a reference point cloud, and then sending a new reference point cloud when the change exceeds a threshold.

When the reference point cloud has been sent to the client, the process proceeds to a continuous sub-process executed for each time step of the point cloud streaming. In the continuous sub-process, at step 812, the server first receives, or predicts, an up-to-date client location in relation to the reference point cloud. Then, at point, 816, the server captures raw sensor data into an up-to-date point cloud, which is then processed in order for changes, that have occurred since the last capture, to be transformed as prioritized transformations to the client.

Since point cloud data is a format for describing virtual content in full 3D format, different viewpoints may be chosen for inspecting scene data. Thus, in some embodiments, the viewpoint used by the client is also taken into an account when optimizing the content, in order to comply with the quality requirements for the particular client more accurately. In various embodiments herein, as the changes in the dynamic point cloud are prioritized according to a magnitude of a visual impact of a particular change as perceived by a viewer, the viewpoint to the content used by the viewer has an effect on weighting the visual impact of the particular change. In some embodiments, changes close to the viewer are typically more visible than similar changes on an object far away from the user (or viewer), and thus may be prioritized accordingly. Therefore, in various embodiments described herein, there is a value to the client reporting the viewpoint used for inspecting the content back to the server, continuously.

The streaming of changes in the captured point cloud that have occurred since the previously processed time step, start, at step 818, by first isolating the areas of the point cloud where there is deviation from the previously captured point cloud. The newly-captured point cloud (and hence the current point cloud to be processed) is compared against the reference point cloud. In some embodiments, all areas of the capture point that feature, e.g., distinctly deviating overall geometry are isolated into separate clusters.

In some embodiments, clusters are, e.g., isolated (e.g.,) continuous areas of a point cloud that differ from the reference point cloud. In some embodiments, a continuous area may refer, e.g., to an area made up of a collection (e.g., a group) of points that are relatively close to each other (e.g., located below a given threshold distance from each other). As will be described in more detail, e.g., once an original cluster area is processed, the cluster may be inspected again (e.g., in subsequent processing) to identify any finer-grained areas or sub-areas that are still deviating. In some embodiments, the identification of clusters enables identification of which areas of the point cloud have changed since the last update step in order to be able to then approximate a transformation that best estimates the changed point locations within that cluster. In some embodiments, clustering can be accomplished by first subtracting the newly-captured point cloud from the reference point cloud, and hence comparing point locations between the reference and captured point clouds with some tolerance of Euclidean distance, so that if there are points within the tolerance distance, the corresponding points in the newly-captured point cloud can be marked as not deviating. According to the examples, once the captured point cloud has been purged of points that had not deviated, the result is deviating areas. These areas can then be clustered to isolated deviating areas.

Point cloud registration and difference comparison may be accomplished by an iterative closest point approach, or other similar approaches. See, e.g., HUANG, Jing et al., "Point cloud matching based on 3D self-similarity," Computer Vision and Pattern Recognition Workshops (CVPRW), 2012 IEEE Computer Society Conference on IEEE, 2012. p. 41-48; BOUAZIZ, Sofien et al., "Sparse iterative closest point," Computer graphics forum. Blackwell Publishing Ltd, 2013. p. 113-123; and an article at www.pointclouds.org/documentation/tutorials/cluster_extraction.php.

Referring now to FIG. 7B, when deviating areas are separated into clusters (steps 818), at step 820, clusters are prioritized according to, e.g., a visual impact of the change contained in a given cluster for the client view. As discussed hereinbefore, a client viewpoint is important because, in some embodiments, it is used for determining what changes in the point cloud data are important for the client. In some embodiments, the visual impact may be determined so that changes that are relatively big, near the viewing user and near the current focus of the viewing direction are more important than smaller changes that are far away from the viewing user and directions more towards the back of the viewing user. In some embodiments, the magnitude of the change may depend both on an area of the point cloud that changes and a distance of that area from the viewer. In some situations, changes far from the viewpoint may not have significant visual impact for the viewer.

In some embodiments, the distance used in calculating the priority (also denoted as "importance," in FIG. 7B) for each cluster may be the distance of the point from the virtual viewpoint (e.g., that the client is using to inspect the point cloud at the client side). This distance may be calculated from the current client location provided in step 814. In some embodiments, for clusters, the distance may be an average distance of each point in the cluster from the virtual viewpoint that the client is using. In some embodiments, all points in the point cloud may be defined using a global point cloud coordinate system and the client viewpoint may use this same coordinate system. For instance, if the current viewpoint is located at coordinates (x,y,z) in the point cloud, the viewpoint may be given as a combination of coordinates (x2,y2,z2) and a vector (x3,y3,z3). In some situations, the viewpoint vector may be a unit vector. Further, in some embodiments, an additional information, such as a viewing frustum used by the client, could be signaled to the server. For instance, referring back to the example process of FIG. 6, only a part of a point cloud visible to the client may be processed. In some embodiments, in order to enable the server to determine the visible area, the server may, e.g., need to know in addition to, e.g., a viewpoint and a direction, the field of view (e.g., a viewing frustum).

At step 822, a cluster with a highest priority (e.g., highest calculated importance metric (e.g., score), as in FIG. 7B) is processed. As described hereinbefore in connection with FIGS. 5 and 6 and will be described in more detail in connection with FIG. 8, processing of a given cluster (e.g., the cluster with the highest priority) involves, in some embodiments, determining a 3D transformation to be applied to the reference point cloud or, if such transformation cannot be determined, determining points to be added and/or removed from the reference point cloud according to a change.

At step 824, the cluster area in the reference point cloud is updated by the server in accordance with a processing result. Further, as shown in FIG. 7B, at step 824, information regarding the processing result (e.g., information related to transformation or point removal and/or addition) may also be transmitted by the server to the client to update the reference point cloud at the client side. At step 826, the cluster just processed is inspected again by the server to identify further areas (referred herein also as "sub-areas" or "finer-grained areas of residual change") in the processed cluster that still deviate. Once identified, new clusters are formed and an importance of each new cluster is calculated as previously described.

At step 828, the server determines whether there is still sufficient processing budget left to continue processing. If the decision result is positive, the processing returns to step 822, in which newly formed clustered and their corresponding importance values are added to the previously formed clusters to again determine a cluster with a next highest priority, and proceed down the processing block as described.

If on the other hand, the decision result is negative, the process moves to step 830, at which a decision is made as to whether an end of the current session has been requested, e.g., by the client. If the decision result is negative, the process returns to step 814. If the decision result is positive, the processing moves to step 832, at which a decision is made as to whether process termination has been requested. If so, the process ends at 834. If not, the process returns to step 804, as shown in FIG. 7A, at which the server waits for another request from the client for point cloud streaming.

Example cluster processing, in accordance with some embodiments, will now be described in greater detail.

In some embodiments, in the processing of each cluster, the goal may be to find a rigid transformation that accurately describes a deviation between the reference point cloud and captured point cloud. If no transformation is found to describe the deviation, then, in some embodiments, points can be added and/or removed from the reference point cloud in order to make the reference point cloud, e.g., similar to the captured point cloud.

Figure 8:
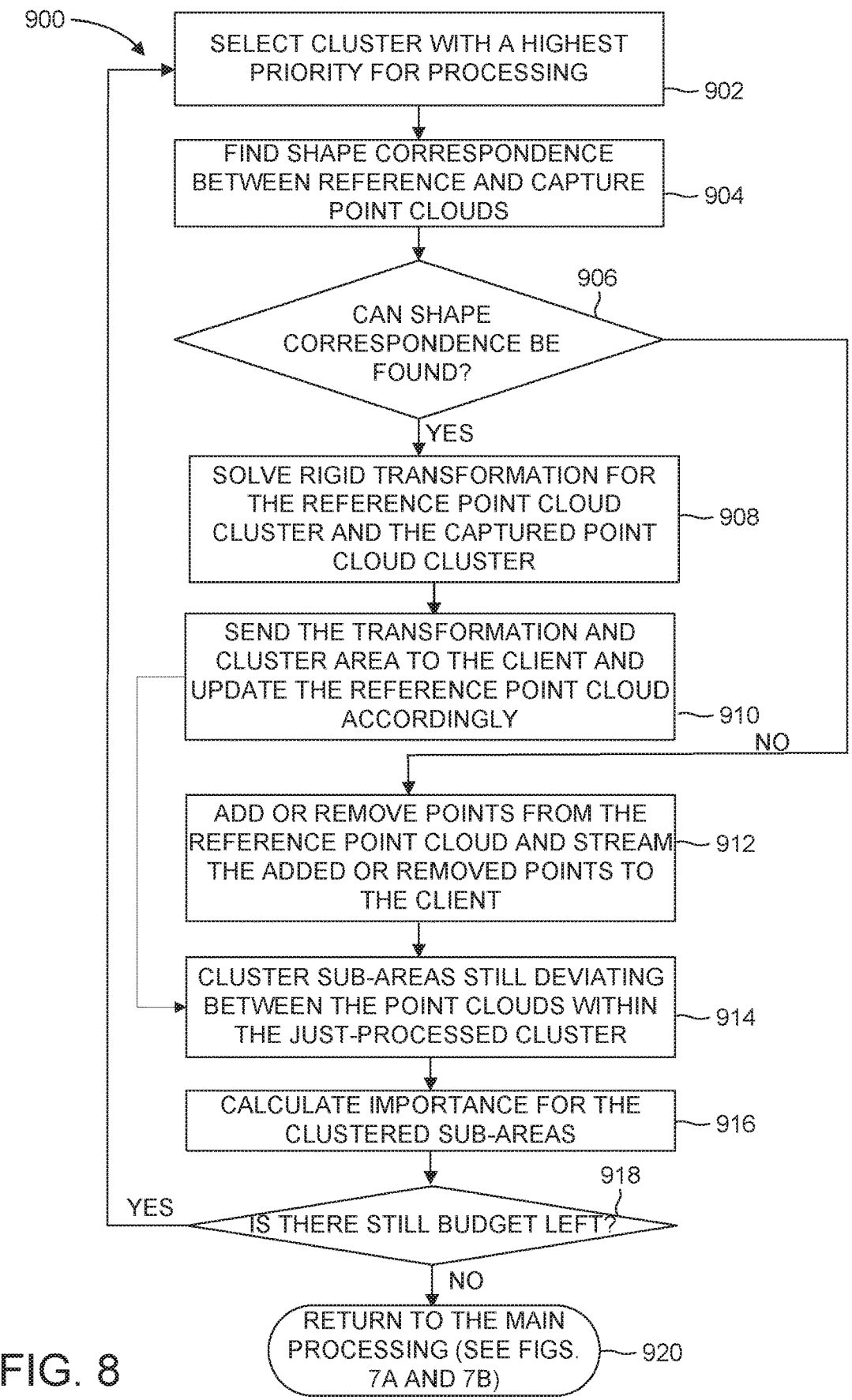
FIG. 8 is a flow chart of an example method of processing a cluster, according to some embodiments.

FIG. 8 is a flow chart of an example method of processing a cluster, according to some embodiments. In some embodiments, the processing may be carried out by a server.

Processing of clusters may involve assigning a respective priority to each cluster, such that a cluster with a highest priority is selected for processing first.

As such, at step 902, the server may select a cluster with a highest priority for processing. As described above, the determination of a priority of a given cluster may be based, in some embodiments, on determining (e.g., calculating) an importance (e.g., a score indicative of importance, or, e.g., priority) of the cluster, where the importance is indicative of a visual impact of a change contained in the cluster with respect to a viewer's current viewpoint. After the cluster to be processed has been selected, at step 904, the server compares the reference point cloud and a newly-captured point cloud to find a shape correspondence of a cluster area between the two point clouds. In some embodiments, the goal is to ascertain whether the same overall geometric shape is present in both point clouds, which could mean that the cluster area has transformed between the two time points. Depending on whether a shape correspondence is found (at step 906), in some embodiments, the processing branches either to solve the transformation (at step 908 and on) or move (e.g., directly) to a process of point addition and/or removal (at step 912).

In general, it will be understood that there are numerous example techniques respecting how a shape correspondence between two point clouds may be carried out. This process may involve, for instance, a process of registration of two point cloud datasets. The point cloud registration process may generally involve estimating correspondences based, e.g., on similarities between features and positions, from which a transformation may be estimated (such as in the form of a rigid transformation matrix that, when applied to one of the datasets, can align it with the other dataset). See, e.g., an article at pointclouds.org/documentation/tutorials/registration_api.php #registration-api.

As one illustrative example, in some embodiments, the server may be configured to run a fairly rough shape estimation between deviating clusters that are located relatively close to each other in the reference point cloud and the newly-captured point cloud. If, as a result, there appears to be a match, the server may subsequently execute an iterative closest point (ICP) algorithm to find (e.g., optimal) transformation. In some embodiments, if needed, the server may perform an additional check if an error between registered clusters is below, e.g., a given threshold to ensure that a correspondence exists.

Note that, with benefits of the example embodiments described herein, an accuracy of a shape correspondence does not need to be relatively high since hierarchical point cloud data processing or inspection of clusters, as described herein in accordance with some embodiments, will correct residual errors in the data. As such, in some embodiments, performing an ICP on clusters may be sufficient because even with poorly matching clusters, the following sub-area cluster processing (as described earlier and in more detail below) may correct residual errors.

Further, in some embodiments, finding shape correspondence (e.g. matching) could include producing a bounding volume for a cluster area and matching it to approximately same size/shape bounding volumes. In this case, a bounding volume may be created with a more complex geometry (e.g., more complex than just a box) if an accuracy of the match needs to be increased.

If, at step 906, a similar geometric area detected as deviating area from one point cloud is detected from the second point cloud, then the server may determine that the deviation is caused by a transformation of the deviating area. In this case, in some embodiments, the transformation that may best describe the transformation is solved for, at step 908. Generally, according to some embodiments, rigid transformations (e.g., translation and rotation), are considered and solved for by forming a linear system B=R*A+t from the two corresponding point cloud areas (A in reference point cloud and B in the captured point cloud). From the linear system, R and t are solved by minimizing the least square error calculated from the deviation of points between the two corresponding point cloud areas. For solving R and t that give smallest squared error, multiple different analytical or iterative linear solvers can be used.

Transformation may include known methods (e.g., a transformation matrix) used in linear algebra and computer graphics. A transformation matrix may combine rotation and translation into a single matrix. With a transformation matrix, points can be transformed by multiplying point coordinates with the transformation matrix. 3D transformation matrices are typically of shape 3 by 4. With a rigid transformation, the first 3 by 3 portion may be interpreted as describing rotation, while the latter 3 by 1 portion may describe the translation. See, e.g., an article at en.wikipedia.org/wiki/Transformation_matrix.

At step 908, the transformation (e.g., rigid transformation) approximating the deviation between two point clouds is solved. In some embodiments, the solved transformation may (e.g., optimally) the reference point cloud cluster to the captured point cluster. At step 910, the server may modify the reference point cloud by applying the transformation to the deviating area (also referred herein to in places as "changed area") in the reference point cloud. At step 910, the transformation and an indication of the deviating area may also be sent by the server to the client, so that the client can update a local copy of the reference point cloud at the client side accordingly. In some embodiments, the indication may be in the form of bounding volume coordinates indicative of a changed area. In this manner, the client can locally track the server's updates to the reference point cloud.

In the event that a shape correspondence is not found (step 906), at step 912, the reference and captured point cloud areas of the cluster may be inspected by the server to define point addition (e.g. points to be added) and/or point removal (e.g., point to be removed) from the reference point cloud that, e.g., replicate the appearance of the deviating area in the captured point cloud. To illustrate, if a hole exists in a geometry in the reference point cloud for which data now becomes visible, that part of the new data filling the hole in the captured point cloud is added to the reference point cloud by adding points. Alternatively, if points appearing in the reference point cloud are no longer present in the captured point cloud, those points may be removed from the reference point cloud. Such point removal can be, for example, caused by an object moving outside the captured area. At step 912, as points are added and/or removed from the reference point cloud by the server, in some embodiments, as shown in FIG. 8, the point information is also sent (e.g., streamed) to the client so that the client can perform the same point addition/removal operations on the client's local copy of the reference point cloud. In some embodiments, the points added may be down-sampled from the full resolution data present in the captured point cloud. This may occur if, for example, the resolution of the captured point cloud is significantly higher relative to the resolution used within the reference point cloud.

When the transformation has been performed on the reference point cloud (step 910), or points added to and/or removed from the reference point cloud (step 912), at step 914, server may inspect the cluster area (also referred to herein in places as "main area of change" or "main cluster area")) again in order to cluster possible sub-areas (also referred to herein in places as "finer-grained areas" of "finer-grained areas of residual change") within the cluster that has just been processed that may be still deviating, or showing residual change(s). In some embodiments, to identify one or more sub-areas within the processed cluster having the highest priority, the server compares the captured point cloud with the updated reference point cloud to identify finer-grained areas (if any) that may still deviate from the updated reference point cloud.

As described previously, the updated reference point cloud may be the original reference point cloud to which either a transformation has been applied or that has been modified with point addition and/or removal. In some embodiments, new clusters may be defined for the identified sub-areas, and, at step 916, the new clusters may be prioritized (e.g., assigned a respective priority) by determining (e.g., calculating) a respective importance for each new cluster. Such calculation may be performed in a similar way as described hereinbefore for clusters corresponding to the main cluster areas. Then, the server may add these new clusters to a list of clusters to be processed if, at step 918, the server determines that a processing budget is still left. Hence, the list of clusters will now include previously prioritized main cluster areas (on the basis of their importance) and the new clusters with their respective importance values, or priorities. In some embodiments, a processing budget includes a time that the server has available for calculating needed transformations and/or point cloud addition/removal between each point cloud update cycle. If the processing budget is no longer available, then, at step 920 the server may return to the main processing as shown in FIGS. 7A and 7B (see, e.g., FIG. 7B and corresponding description thereof (e.g., steps 830 and 832).

If there is still processing budget left, when the cluster with the highest priority has been processed and new clusters have been isolated for sub-areas within that cluster that still have deviation, the processing moves back to step 902 in which the server selects a next cluster with a next highest priority to be processed from the list of prioritized clusters. In this regard, in some embodiments, a next cluster having a next highest priority may be either one of the remaining clusters previously identified for main areas of change or a cluster corresponding to one of sub-areas (e.g., a sub-area within just-processed clustered with the previously highest priority). In some embodiments, the processing shown in FIG. 8 continuously prioritizes clusters that have the highest visual impact from among identified clusters so as to ensure that as much of a visible change as possible between point cloud update cycles are reproduced in the reference point cloud and sent to the client.

In some embodiments, processing of updates may be carried out continuously until a user at the client side or the server side requests the process to be terminated (e.g., as shown in the example processes described in FIGS. 5-8). Then, depending, e.g., on the request, the processing on the server side may either go back to waiting for client connection requests or terminate the process altogether.

Example variations, in accordance with some embodiments, will now be described.

In some embodiments, a server may concurrently handle connections with multiple clients. In this case, the server may, e.g., continuously listen for client connection requests and, e.g., whenever a client signals an intent to connect to the server, the server may send a current reference point cloud to the connecting client. As such, in accordance with some embodiments, various methods described herein may performed for each of the clients actively connected to the server. In some embodiments, the server may also receive a given location from each of all of the connected clients in order to, e.g., consider the location when determining (e.g., calculating) respective importance values (e.g., scores) for clusters processed for the particular client. As noted hereinbefore, in some embodiments, client location may be used to determine a distance of areas within a given point cloud, e.g., in relation to a client viewpoint. In this regard, in some embodiments, as described previously, an importance calculation (and hence, for example, a cluster priority) is based at least in part on a distance of an area of change from a current viewpoint of the client.

In some embodiments, various embodiments of the disclosed methods may be carried out by a server on the basis of pre-captured dynamic point cloud sequences. Namely, according to some embodiments, in this particular variation, point cloud data may be stored on and retrieved from a storage medium rather than from sensors. Further, in some embodiments, that data can be transformed into an (e.g., optimized) stream of prioritized transformations (using, for example, various techniques described herein in accordance with some embodiments) as a pre-processing step before any client requests the data.

In some embodiments, a server may additionally inspect the point cloud data to estimate region correspondence with pre-defined object models. The server can then indicate for a viewer some natural markers that a client may use for contextual adjustment of a viewing application. In this regard, in some embodiments, as the point cloud (data) is being processed, a separate shape classification could also be executed on the point cloud in order to detect, e.g., if known object types can be identified from the point cloud.

In some embodiments, a server may analyze a point cloud to provide a client with contextual information along with a reference point cloud. For example, the server may analyze the point cloud to estimate a floor plane in the point cloud, and provide this information to the client. The client may then use the floor plane information to align the point cloud display such that a floor plane featured within the point cloud data coincides with the floor plane of the viewers physical environment. In some embodiments, this is an example of how object recognition could be used. More particularly, a separate object recognition may be executed by the server on the point cloud and if something 'contextually' significant is detected, e.g., in this case a floor plane, the server may transmit that information to the client.

In some embodiments, the contextual understanding of point cloud data may be used by a server to filter out parts of the content. In this regard, in some embodiments, instead of just signaling contextually meaningful information to a client (as, e.g., described above), the server may use that information to process the point cloud data at the server side. In some embodiments, filtering may be driven by a client request or some pre-defined settings (e.g., at the server side). For example, a client may request the server to only stream updates to dynamic elements in a scene, or filter out a floor and a ceiling of a captured content. Hence, in some embodiments, the server may only stream updates to elements that are (e.g., at least partially) dynamic (and hence likely to change with time) rather than elements that are stationary.

An example operation, in accordance with some embodiments, will now be described. In one possible example operation, a camera array may be aimed at a wall and a door. From the camera array data, a 3D point cloud may be produced which then can be distributed for client(s). At the client side, the 3D point cloud can be viewed using MR glasses in a way which enables motion parallax. Using disclosed methods and systems according to some embodiments, a server may produce the point cloud from the camera array data. When a client connects to the server, the server may begin to stream dynamic point cloud sequence to the client, starting with a first point cloud to be set as a reference point cloud. Local device tracking may be executed on the client device and the client may begin sending a viewpoint location relative to the reference point cloud, once the client has received the reference point cloud and selected an initial viewpoint. In some embodiments, the client may select the initial viewpoint to the point cloud data based on local user preferences.

When the client first connects with the server and requests the (e.g., optimized) dynamic point cloud stream, the server sends the full point cloud that is used as the reference point cloud. After the reference point cloud has been sent to the client, in some embodiments, only updates relative to this reference point cloud are sent (e.g., for some time period).

If nothing changes in the scene for some period of time, in some embodiments, the primary data exchange involves the client sending its location, relative to the point cloud, to the server. During this time, the server continuously estimates changes occurring in the dynamic point cloud data, using the updated client viewpoint location in prioritizing the occurring changes, in order to transmit to the client those changes that have the biggest visual impact. In some embodiments, when capturing a static scene in which elements are not moving or changing, the sensor used for capturing the point cloud can have a measuring noise or inconsistent measure density, which may cause the captured point cloud sequence to feature dynamic behavior even though the captured point cloud sequence is being recorded from a static scene. In some embodiments, the server will continuously detect changes in the point cloud data, prioritize the changes using the most up-to-date client location, and stream the changes as transformations to the client based on the priorities associated with those changes.

Further, in this example operation (capturing the wall and the door), the door may begin to open. The server may capture point cloud data from time steps as the door begins to open. The process may isolate the door as a cluster of a deviation area and find for each time step a transformation that approximates the motion of the area of the point cloud containing the door. When the sensor captures an image of a person opening the door, in some embodiments, the process may also start to send these new points (capturing the person) that had not previously been present in the reference point cloud.

When the person opening the door is completely visible and new points in the point cloud (of the captured person) are sent to the client, then, in some embodiments, motions of the person may be approximated as rigid body transformations at a coarse level, and during each frame of the capture, these rigid body transformations may be further estimated from the coarse level to a finer-detail level (as, e.g., described hereinbefore), so that the deformation of the body appearance from captured frame to frame is continuously being approximated.

Figure 9:
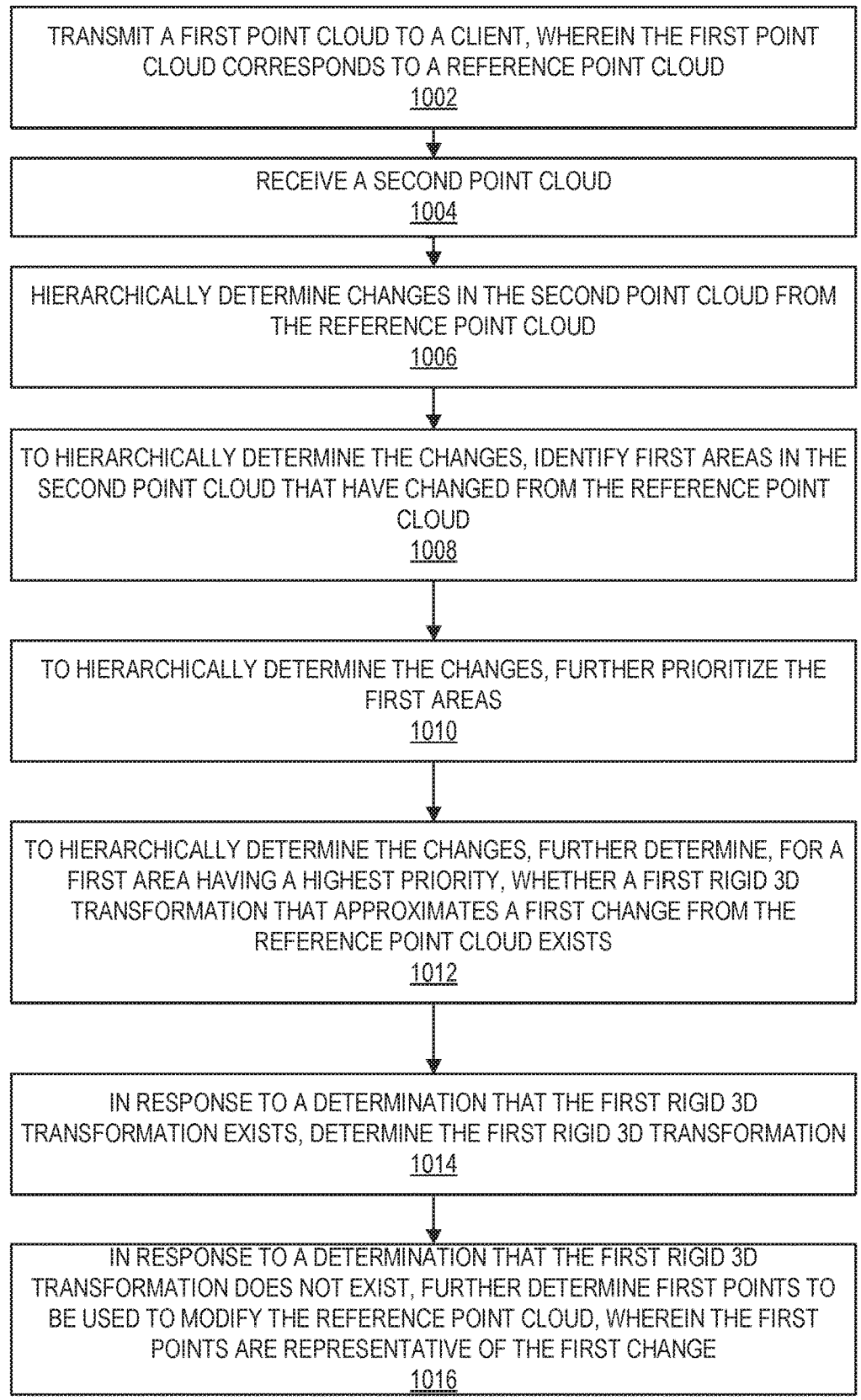
FIG. 9 is a flow chart illustrating an example method, in accordance with some embodiments.

FIG. 9 is a flow chart illustrating an example method 1000, in accordance with some embodiments. In some embodiments, the method is performed by a server. At step 1002, the server transmits a first point cloud to a client, wherein the first point cloud corresponds to a reference point cloud. At step 1004, the server receives a second point cloud. At step 1006, the server hierarchically determines changes in the second point cloud from the reference point cloud. To hierarchically determine the changes, at step 1108, the server identifies first areas in the second point cloud that have changed from the reference point cloud. To hierarchically determine the changes, at step 1110, the server further prioritizes the first areas. To hierarchically determine the changes, at step 1012, for a first area having a highest priority, the server determines whether a first rigid 3D transformation that approximates a first change from the reference point cloud exists. At step 1014, in response to a determination that the first rigid 3D transformation exists, the server determines the first rigid 3D transformation that approximates the first change from the reference point cloud. Finally, at step 1016, in response to a determination that the first rigid 3D transformation does not exist, the server further determines first points to be used to modify the reference point cloud, wherein the first points are representative of the first change.

Figure 10A:
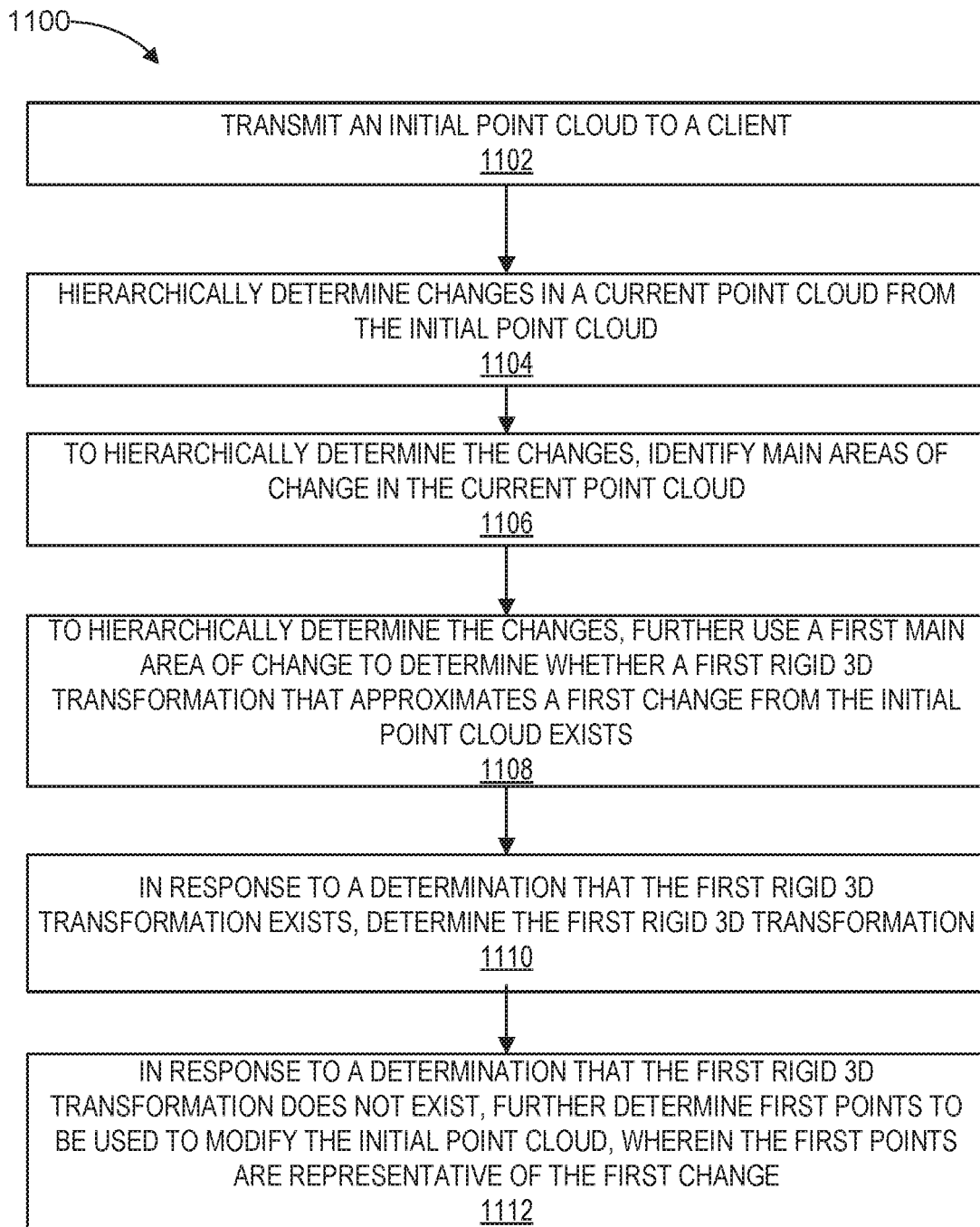
FIGS. 10A and 10B are respective flow charts illustrating another example method, in accordance with some embodiments.
Figure 10B:
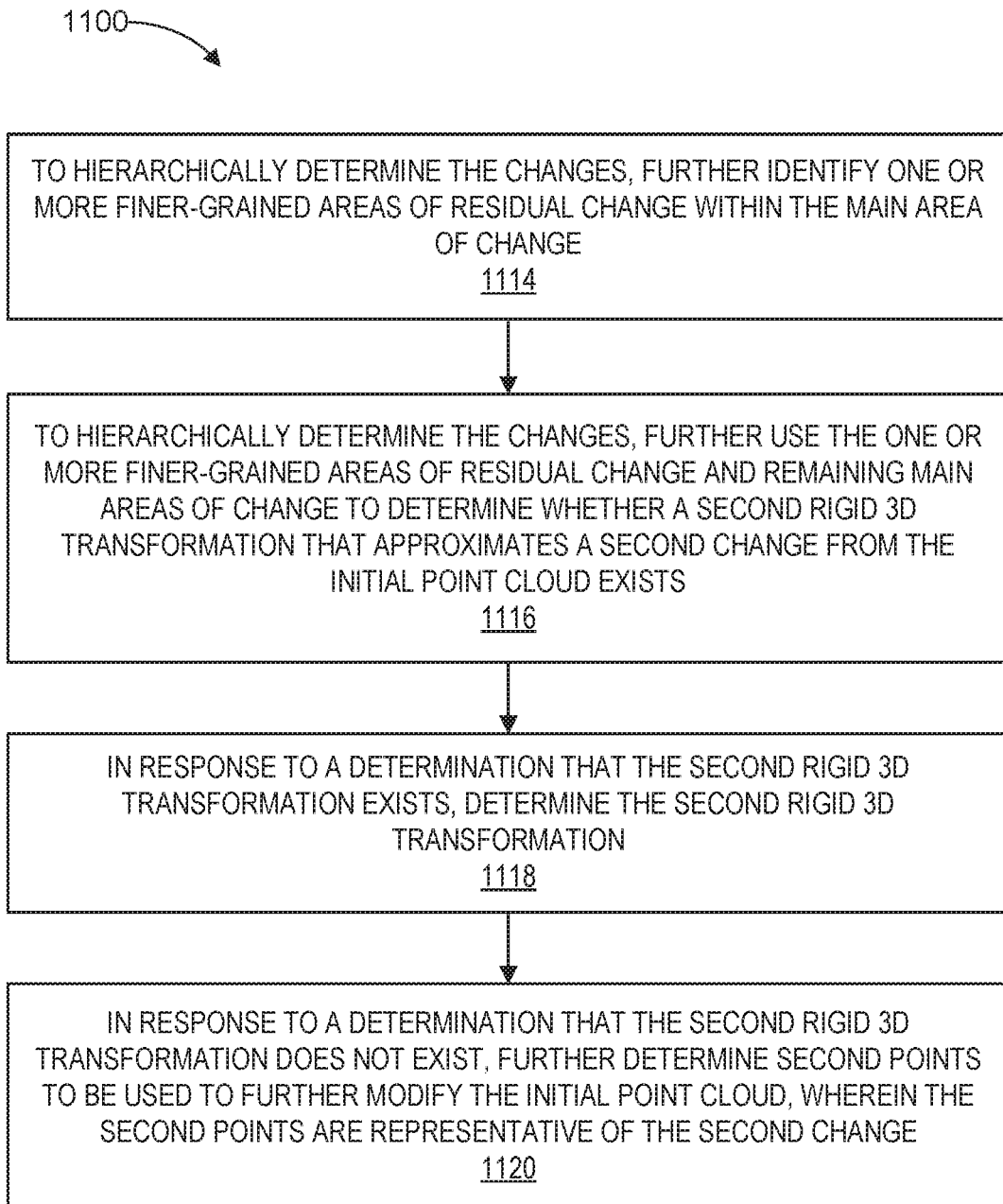

FIGS. 10A and 10B are respective flow charts illustrating another example method 1100, in accordance with some embodiments. Note that FIG. 10B is a continuation of the method steps shown in FIG. 10A. In some embodiments, the method is performed by a server. At step 1102, the server transmits an initial point cloud to a client. At step 1104, the server hierarchically determines changes in a current point cloud from the initial point cloud. To hierarchically determine the changes, at step 1106, the server identifies main areas of change in the current point cloud. To hierarchically determine the changes, at step 1108, the server further uses a first main area of change to determine whether a first rigid 3D transformation that approximates a first change from the initial point cloud exists. At step 1110, in response to a determination that the first rigid 3D transformation exists, the server determines that the first rigid 3D transformation that approximates the first change from the initial point cloud the server. At step 1112, in response to a determination that the first rigid 3D transformation does not exist, the server further determines first points to be used to modify the initial point cloud, wherein the first points are representative of the first change. At step 1114, to hierarchically determine the changes, the server further identifies one or more finer-grained areas of residual change within the main area of change. To hierarchically determine the changes, at step 1116, the server further uses the one or more finer-grained areas of residual change and remaining main areas of change to determine whether a second rigid 3D transformation that approximates a second change from the initial point cloud exists. At step 1118, in response to a determination that the second rigid 3D transformation exists, the server determines the second rigid 3D transformation that approximates the second change from the initial point cloud. Finally, at step 1120, in response to a determination that the second rigid 3D transformation does not exist, the server further determines second points to be used to further modify the initial point cloud, wherein the second points are representative of the second change.

Further, various (e.g., related) embodiments have been described hereinabove.

According to some embodiments, a method of representing a time series of point cloud frames as a set of hierarchical 3D transformations applied to a reference point cloud is disclosed. In some embodiments, a series of rigid transforms may be used to alter reference point cloud. In some embodiments, additional signaling can add or remove points from the reference point cloud.

According to some embodiments, a method of encoder side selection of transformations for representation of content is disclosed.

According to some embodiments, an optimization of pre-captured content for distribution to a client rather than live encoding is disclosed.

According to some embodiments, signaling additional context analysis data, such as e.g., location of recognized elements in addition to point clouds and transformations is disclosed.

According to some embodiments, a method of providing 3D data to a client may include: receiving 3D data as a first point cloud; responsive receiving to a request from the client, sending the first point cloud to the client and storing the first point cloud as a reference point cloud, and then iteratively receiving 3D data as a current point cloud; receiving, from the client, a current observation viewpoint; and responsive to receiving the current observation viewpoint; determining a change in the viewpoint of the current point cloud relative to a viewpoint of the reference point cloud; performing a hierarchical inspection of the current point cloud relative to the reference point cloud, to identify areas of deviation; clustering areas of deviation; calculating scores for the clustered areas of deviation; determining shape correspondences for the clustered areas of deviation; and responsive to determining a similar shape for a clustered area of deviation; applying a transform to the reference point cloud; and sending a transformation and an indication of the clustered area to the client; responsive to not determining a similar shape for a clustered area of deviation; adding or removing points from reference point cloud; and sending the added or removed points to the client.

According to some embodiments, another method of providing 3D data to a client may include: receiving 3D data as a first point cloud; responsive to receiving a request from the client, sending the first point cloud to the client and storing the first point cloud as a reference point cloud; starting a process for streaming point cloud data to the client, the process iteratively performed for new point clouds until a request to terminate is received, the process comprising: receiving 3D data as a current point cloud; performing a hierarchical inspection of the current point cloud relative to the reference point cloud, to identify areas of deviation; clustering areas of deviation; calculating scores for the clustered areas of deviation; determining a transformation that approximates a shape a clustered area of deviation; and responsive to determining a transformation; applying a transform to the reference point cloud; and sending the transformation and an indication of the clustered area to the client; responsive to not determining a transformation; adding or removing points from reference point cloud; and sending the added or removed points to the client.

In some embodiments, receiving 3D data may include receiving data from a sensor or receiving pre-captured dynamic point cloud sequences from a storage medium. In some embodiments, the sensor data may be RGB-D captured data, LIDAR captured data, or some other type. Sending the first point cloud to the client may, in some embodiments, include sending radiance image data to the client. In some embodiments, the scores may be calculated based on a weighed sum of the size of the area, an amount of deviation, and a distance of the deviation area from the current viewpoint. Additionally, in some embodiments, each of the methods may further include determining whether time remains in a processing budget for processing additional clusters and, if time does remain, processing additional clusters. In some embodiments, the method may further include negotiating, between a server and the client, the processing budget for setting time and bandwidth limits for point cloud updates.

A system may perform the methods using a processor and a non-transitory computer-readable medium storing instructions that are operative, when executed by the processor, to perform any of the disclosed methods. In some embodiments, the system may also include a 3D sensor.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method, comprising:
   obtaining a first point cloud in a time sequence of point clouds, the first point cloud corresponding to a first time in the time sequence of point clouds;
   obtaining a second point cloud in the time sequence of point clouds, the second point cloud corresponding to a later time in the time sequence of point clouds than the first point cloud;
   determining areas of deviation between the first point cloud and the second point cloud;
   selecting a first area of deviation from among the determined areas, wherein selecting the first area of deviation is based on respective importance scores;
   generating a representation of the changes between the first point cloud and the second point cloud in the first area of deviation, wherein the representation of the changes comprises at least one of a 3D transformation, a set of points to be added, and a set of points to be removed;
   updating the first point cloud using the representation;
   repeating the determining, the selecting, the generating, and the updating steps to obtain a series of representations of the changes between the first point cloud and the second point cloud; and
   transmitting the series of representations of the changes to a client device.

2. The method of claim 1,
   wherein the generated representation comprises a first representation that captures coarse changes, and
   a second representation that captures finer residual changes.

3. The method of claim 1, wherein the first point cloud and the second point cloud are obtained from one or more 3D sensors.

4. The method of claim 1, wherein the time sequence of point clouds is accessed from a storage medium.

5. The method of claim 1, wherein the 3D transformation comprises rotation and translation.

6. The method of claim 1, wherein the 3D transformation is represented using a transformation matrix.

7. The method of claim 1, wherein the areas of deviation between the first point cloud and the second point cloud are determined using a clustering technique.

8. The method of claim 1, wherein an importance score for an area of deviation reflects a visual importance of the changes between first and second point clouds in the area of deviation.

9. The method of claim 1, further comprising
determining a budget for representing the changes between the first point cloud and the second point cloud; and
repeating the determining, selecting, generating and updating steps until the budget is exhausted.

10. The method of claim 9, wherein the budget comprises at least one of an amount of time, an amount of processing, or an amount of bandwidth available to update the first point cloud based on the changes.

11. A method, comprising:
obtaining a first point cloud in a time sequence of point clouds, the first point cloud corresponding to a first time in the time sequence of point clouds;
receiving from a server a series of representations of changes to the first point cloud, wherein each representation of the series of representations is applicable to an area of deviation between the first point cloud and a second point cloud corresponding to a later time in the time sequence of point clouds, wherein each area of deviation is selected by the server from among areas of deviations between the first and the second point clouds based on respective importance scores, and wherein each representation of the series comprises at least one of a 3D transformation, a set of points to be added, and a set of points to be removed; and
updating the first point cloud by sequentially applying the representations of the series of representations to the first point cloud to obtain a version of the second point cloud.

12. The method of claim 11, wherein obtaining the first point cloud comprises receiving a version of the first point cloud from the server.

13. The method of claim 11, wherein the 3D transformations comprises rotation and translation.

14. The method of claim 11, wherein a first representation and a second representation, of the series of representations, capture first changes and second changes, respectively, to an area of the first point cloud,
wherein the first changes comprise coarse changes to the area and the second changes comprise finer residual changes to the area.

15. The method of claim 11, wherein receiving the series of representations comprises receiving an indication of the area of the first point cloud to which a 3D transformation is to be applied.

16. The method of claim 11, further comprising transmitting to the server information about a viewpoint of a user currently viewing a rendering of the point cloud.

17. An apparatus comprising:
a processor; and
a non-transitory computer-readable medium storing instructions operative, when executed by the processor, to cause the apparatus to:
obtain a first point cloud in a time sequence of point clouds, the first point cloud corresponding to a first time in the time sequence of point clouds;
obtain a second point cloud in the time sequence of point clouds, the second point cloud corresponding to a later time in the time sequence of point clouds than the first point cloud;
determine areas of deviation between the first point cloud and the second point cloud;
select a first area of deviation from among the determined areas, wherein selecting the first area of deviation is based on respective importance scores;
generate a representation of the changes between the first point cloud and the second point cloud in the first area of deviation, wherein the representation of the changes comprises at least one of a 3D transformation, a set of points to be added, and a set of points to be removed;
update the first point cloud using the representation;
repeat the determining, the selecting, the generating, and the updating steps to obtain a series of representations of the changes between the first point cloud and the second point cloud; and
transmit the series of representations of the changes to a client device.

18. The apparatus of claim 17, wherein the generated representation comprises a first representation that captures coarse changes and a second representation that captures finer residual changes.

19. The apparatus of claim 17, wherein the 3D transformation comprises rotation and translation.

20. The apparatus of claim 17, wherein an importance score for an area of deviation reflects the visual importance of the changes between first and second point clouds in the area of deviation.

21. The apparatus of claim 17, further comprising
determining a budget for representing the changes between the first point cloud and the second point cloud; and
repeating the determining, selecting, generating and updating steps until the budget is exhausted.

22. The apparatus of claim 21, wherein the budget comprises at least one of an amount of time, an amount of processing, or an amount of bandwidth available to update the first point cloud based on the changes.

23. An apparatus comprising:
a processor; and
a non-transitory computer-readable medium storing instructions operative, when executed by the processor, to cause the apparatus to:
obtain a first point cloud in a time sequence of point clouds, the first point cloud corresponding to a first time in the time sequence of point clouds,
receive from a server a series of representations of changes to the first point cloud, wherein each representation of the series of representations is applicable to an area of deviation between the first point cloud and a second point cloud corresponding to a later time in the time sequence of point clouds, wherein each area of deviation is selected by the server from among areas of deviations between the first and the second point clouds based on respective importance scores, and wherein each representation of the series comprises at least one of a 3D transformation, a set of points to be added, and a set of points to be removed, and
update the first point cloud by sequentially applying the representations of the series of representations to the first point cloud to obtain a version of the second point cloud.

24. The apparatus of claim 23, wherein obtaining the first point cloud comprises receiving a version of the first point cloud from the server.

25. The apparatus of claim 23, wherein the 3D transformation comprises rotation and translation.

26. The apparatus of claim 23, wherein a first representation and a second representation, of the series of representations, capture first changes and second changes, respectively, to an area of the first point cloud, wherein the first changes comprise coarse changes to the area and the second changes comprise finer residual changes to the area.

27. The apparatus of claim 23, wherein receiving the series of representations comprises receiving an indication of an area of the first point cloud to which a 3D transformation is to be applied.

28. The apparatus of claim 23, further comprising transmitting to the server information about a viewpoint of a user currently viewing a rendering of the point cloud.

* * * * *